(12) United States Patent
Park et al.

(10) Patent No.: US 11,769,870 B2
(45) Date of Patent: Sep. 26, 2023

(54) CARBON ELECTRODE STRUCTURES FOR BATTERIES

(71) Applicant: Enevate Corporation, Irvine, CA (US)

(72) Inventors: Benjamin Yong Park, Mission Viejo, CA (US); Alexander Gorkovenko, Mission Viejo, CA (US); Rabih Bachir Zaouk, Los Angeles, CA (US); William Hubert Schank, Howell, MI (US)

(73) Assignee: ENEVATE CORPORATION, Irvine, CA (US)

( * ) Notice: Subject to any disclaimer, the term of this patent is extended or adjusted under 35 U.S.C. 154(b) by 595 days.

(21) Appl. No.: 15/432,178

(22) Filed: Feb. 14, 2017

(65) Prior Publication Data

US 2017/0155126 A1 Jun. 1, 2017

Related U.S. Application Data

(63) Continuation of application No. 12/838,368, filed on Jul. 16, 2010, now abandoned.

(Continued)

(51) Int. Cl.
*H01M 4/04* (2006.01)
*H01M 4/587* (2010.01)
(Continued)

(52) U.S. Cl.
CPC ......... *H01M 4/0471* (2013.01); *H01M 4/043* (2013.01); *H01M 4/133* (2013.01);
(Continued)

(58) Field of Classification Search
None
See application file for complete search history.

(56) References Cited

U.S. PATENT DOCUMENTS

| | | | |
|---|---|---|---|
| 5,156,225 A | | 10/1992 | Murrin |
| 5,238,760 A | * | 8/1993 | Takahashi ............. C04B 35/532 264/291 |

(Continued)

FOREIGN PATENT DOCUMENTS

| | | |
|---|---|---|
| EP | 1 722 429 | 11/2006 |
| EP | 2 113 955 | 11/2009 |
| WO | WO 2011/088472 | 7/2011 |

OTHER PUBLICATIONS

Datta, et al., "Silicon, Graphite and Resin Based Hard Carbon Nanocomposite Anodes for Lithium Ion Batteries", Journal of Power Sources, Feb. 10, 2007, vol. 165, No. 1, pp. 368-378.

(Continued)

*Primary Examiner* — Maria Laios
(74) *Attorney, Agent, or Firm* — McAndrews, Held & Malloy, Ltd.

(57) ABSTRACT

In certain embodiments, an electrode includes a body of material formed in substantial part of carbon, the body having an exterior surface and an interior located within the exterior surface, and a plurality cavities located in the interior of the body. Each of the cavities is in communication with the exterior of the body and has an interior surface. The cavities can each be sized to accommodate a battery separator located therein and substantially covering the interior surface of the cavity.

24 Claims, 16 Drawing Sheets

Related U.S. Application Data

(60) Provisional application No. 61/315,845, filed on Mar. 19, 2010, provisional application No. 61/295,993, filed on Jan. 18, 2010, provisional application No. 61/226,217, filed on Jul. 16, 2009.

(51) Int. Cl.

| | | |
|---|---|---|
| *H01M 4/66* | (2006.01) | |
| *H01M 4/1393* | (2010.01) | |
| *H01M 4/133* | (2010.01) | |
| *H01M 4/134* | (2010.01) | |
| *H01M 4/02* | (2006.01) | |
| *H01M 10/0525* | (2010.01) | |
| *H01M 10/058* | (2010.01) | |
| *H01M 10/0585* | (2010.01) | |

(52) U.S. Cl.
CPC ......... *H01M 4/1393* (2013.01); *H01M 4/587* (2013.01); *H01M 4/663* (2013.01); *H01M 10/058* (2013.01); *H01M 10/0525* (2013.01); *H01M 4/134* (2013.01); *H01M 10/0585* (2013.01); *H01M 2004/021* (2013.01); *Y02E 60/10* (2013.01)

(56) References Cited

U.S. PATENT DOCUMENTS

| | | | |
|---|---|---|---|
| 5,567,544 A * | 10/1996 | Lyman | H01M 2/1083 429/152 |
| 5,624,606 A | 4/1997 | Wilson et al. | |
| 6,287,728 B1 | 9/2001 | Kajiura et al. | |
| 6,300,013 B1 | 10/2001 | Yamada et al. | |
| 6,413,672 B1 | 7/2002 | Suzuki et al. | |
| 6,432,579 B1 | 8/2002 | Tsuji et al. | |
| 6,436,576 B1 | 8/2002 | Hossain | |
| 6,489,061 B1 | 12/2002 | Hossain | |
| 6,589,696 B2 | 7/2003 | Matsubara et al. | |
| 6,770,399 B2 | 8/2004 | Umeno et al. | |
| 6,946,223 B2 | 9/2005 | Kusumoto et al. | |
| 6,949,314 B1 | 9/2005 | Hossain | |
| 7,037,581 B2 | 5/2006 | Aramata et al. | |
| 7,202,000 B2 | 4/2007 | Iriyama et al. | |
| 7,303,838 B2 | 12/2007 | Morita et al. | |
| 7,316,792 B2 | 1/2008 | Kosuzu et al. | |
| 7,615,314 B2 | 11/2009 | Kawakami et al. | |
| 8,603,683 B2 | 12/2013 | Park et al. | |
| 9,178,208 B2 | 11/2015 | Park et al. | |
| 9,397,338 B2 | 7/2016 | Park et al. | |
| 9,553,303 B2 | 1/2017 | Park et al. | |
| 9,583,757 B2 | 2/2017 | Park et al. | |
| 9,620,809 B2 | 4/2017 | Turon Teixidor et al. | |
| 9,647,259 B2 | 5/2017 | Park et al. | |
| 9,806,328 B2 | 10/2017 | Park et al. | |
| 9,941,509 B2 | 4/2018 | Park et al. | |
| 9,997,765 B2 | 6/2018 | Park | |
| 10,103,378 B2 | 10/2018 | Park et al. | |
| 10,388,943 B2 | 8/2019 | Bonhomme et al. | |
| 10,431,808 B2 | 10/2019 | Park et al. | |
| 10,461,366 B1 | 10/2019 | Anderson et al. | |
| 2003/0003348 A1 * | 1/2003 | Hanket | H01M 8/086 429/529 |
| 2003/0049537 A1 * | 3/2003 | Wadley | H01M 4/385 429/238 |
| 2003/0082446 A1 | 5/2003 | Chiang et al. | |
| 2004/0137327 A1 | 7/2004 | Gross et al. | |
| 2006/0035149 A1 | 2/2006 | Nanba | |
| 2006/0040182 A1 | 2/2006 | Kawakami et al. | |
| 2006/0051670 A1 | 3/2006 | Aramata et al. | |
| 2006/0051675 A1 | 3/2006 | Musha et al. | |
| 2006/0134516 A1 | 6/2006 | Im et al. | |
| 2006/0147802 A1 | 7/2006 | Yasuda et al. | |
| 2006/0154141 A1 | 7/2006 | Salot et al. | |
| 2006/0275668 A1 | 12/2006 | Peres et al. | |
| 2007/0054190 A1 | 3/2007 | Fukui et al. | |
| 2007/0072084 A1 | 3/2007 | Katsushi et al. | |
| 2007/0077490 A1 | 4/2007 | Kim et al. | |
| 2007/0154811 A1 | 7/2007 | Oh et al. | |
| 2007/0212610 A1 | 9/2007 | Sonobe et al. | |
| 2007/0243469 A1 | 10/2007 | Kim et al. | |
| 2008/0020282 A1 | 1/2008 | Kim et al. | |
| 2008/0145757 A1 | 6/2008 | Mah et al. | |
| 2008/0145761 A1 | 6/2008 | Petrat et al. | |
| 2008/0160409 A1 | 7/2008 | Ishida et al. | |
| 2008/0176138 A1 | 7/2008 | Park et al. | |
| 2008/0280207 A1 | 11/2008 | Patoux et al. | |
| 2008/0286657 A1 | 11/2008 | Hasegawa et al. | |
| 2009/0004566 A1 | 1/2009 | Shirane et al. | |
| 2009/0029256 A1 | 1/2009 | Mah et al. | |
| 2009/0053608 A1 | 2/2009 | Choi et al. | |
| 2009/0087743 A1 | 4/2009 | Kim et al. | |
| 2009/0117467 A1 | 5/2009 | Zhamu et al. | |
| 2009/0117468 A1 | 5/2009 | Eom | |
| 2009/0136809 A1 * | 5/2009 | Wang | H01G 11/24 429/532 |
| 2009/0181304 A1 | 7/2009 | Miyamoto et al. | |
| 2009/0202911 A1 | 8/2009 | Fukuoka et al. | |
| 2009/0291368 A1 | 11/2009 | Newman et al. | |
| 2010/0143798 A1 | 6/2010 | Zhamu et al. | |
| 2010/0255376 A1 | 10/2010 | Park et al. | |
| 2011/0020701 A1 | 1/2011 | Park et al. | |
| 2011/0177393 A1 | 7/2011 | Park et al. | |
| 2014/0170498 A1 | 6/2014 | Park | |
| 2017/0040598 A1 | 2/2017 | Wang et al. | |
| 2017/0133664 A1 | 5/2017 | Park | |
| 2017/0170510 A1 | 6/2017 | Turon Teixidor et al. | |
| 2017/0279093 A1 | 9/2017 | Park | |
| 2018/0062154 A1 | 3/2018 | Park et al. | |
| 2018/0198114 A1 | 7/2018 | Bonhomme et al. | |
| 2018/0219211 A1 | 8/2018 | Park et al. | |
| 2018/0226642 A1 | 8/2018 | Wang et al. | |
| 2018/0287129 A1 | 10/2018 | Park | |
| 2019/0178944 A1 | 6/2019 | Rango et al. | |
| 2019/0181426 A1 | 6/2019 | Park et al. | |
| 2019/0181431 A1 | 6/2019 | Canton | |
| 2019/0181434 A1 | 6/2019 | Lee et al. | |
| 2019/0181440 A1 | 6/2019 | Park et al. | |
| 2019/0181441 A1 | 6/2019 | Ji et al. | |
| 2019/0181491 A1 | 6/2019 | Park et al. | |
| 2019/0181492 A1 | 6/2019 | Liu et al. | |
| 2019/0181500 A1 | 6/2019 | Ji et al. | |
| 2019/0181501 A1 | 6/2019 | Ji et al. | |
| 2019/0181502 A1 | 6/2019 | Ji et al. | |
| 2019/0190069 A1 | 6/2019 | Ji et al. | |
| 2019/0190070 A1 | 6/2019 | Ji et al. | |
| 2019/0355966 A1 | 11/2019 | Kamath et al. | |

OTHER PUBLICATIONS

Ji et al., "Electrospun Carbon Nanofibers Containing Silicon Particles as an Energy-Storage Medium", Carbon, Nov. 2009, vol. 47, No. 14, pp. 3219-3226.

Lee et al., "Graphene-Silicon Composite for Li-Ion Battery Anodes", http://apps.aiche.org/proceedings/Abstracts.asox?PaperID=162914, dated Sep. 11, 2009 [Retrieved Jun. 23, 2011].

Lee et al., "Silicon Nanoparticles—Graphene Paper Composites for Li ion Battery Anodes", Chemical Communications, 2010, vol. 46, No. 12, pp. 2025-2027.

Wolf, H. et al., "Carbon-Fiber-Silicon Nanocomposites for Lithium-Ion Battery Anodes by Microwave Plasma Chemical Vapor Deposition", Journal of Power Sources, May 1, 2009, vol. 190, No. 1, pp. 157-161.

Ma et al., "Si-Based Anode Materials for Li-Ion Batteries: A Mini Review", Nano-Micro Letters, 2014, vol. 6, No. 4, pp. 347-358.

* cited by examiner

CARBON ELECTRODE STRUCTURES FOR BATTERIES

CROSS-REFERENCE TO RELATED APPLICATIONS

This application is a continuation of U.S. application Ser. No. 12/838,368, filed Jul. 16, 2010, which claims the benefit of U.S. Provisional Application No. 61/226,217, filed Jul. 16, 2009, U.S. Provisional Application No. 61/295,993, filed Jan. 18, 2010, and U.S. Provisional Patent Application No. 61/315,845, filed Mar. 19, 2010, the entirety of each of which is hereby incorporated by reference.

BACKGROUND OF THE INVENTION

Field of the Invention

Embodiments of the present disclosure relate to batteries and electrode structures, and in particular, porous electrodes comprising carbon. Further embodiments relate to methods of preparing electrodes for batteries.

Description of the Related Art

A lithium ion battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. For the cathode, separator and anode to be rolled, each sheet must be sufficiently deformable or flexible to be rolled without failures, such as cracks, breaks, mechanical failures, etc. Typical electrodes include electro-chemically active material layers on electrically conductive metals (e.g., aluminum and copper). Films can be rolled or cut into pieces which are then layered into stacks. The stacks are of alternating electro-chemically active materials with the separator between them.

SUMMARY OF THE INVENTION

In certain embodiments, an electrode includes a body of material formed in substantial part of carbon, the body having an exterior surface and an interior located within the exterior surface, and a plurality cavities located in the interior of the body. Each of the cavities is in communication with the exterior of the body and has an interior surface. The cavities can each be sized to accommodate a battery separator located therein and substantially covering the interior surface of the cavity while still permitting sufficient room for a second electrode material to be located within the cavity spaced from the interior surface of the cavity by the separator. The cavities may be substantially regularly spaced. The cavities can be at least 50 percent of the volume of the body.

In certain embodiments, an electrode for a battery includes a structure having a plurality of engineered cavities and having a composition comprising carbon that is electrochemically active. The electrode may be an anode for a battery. The structure can be configured to be an electrochemically active component and a current collector. The structure may be a monolithic structure and/or be self-supported. The structure may consist essentially of electrochemically active material. The carbon may be formed from a precursor and be electrically conductive. The carbon may also be substantially homogeneous throughout the structure and/or be a substantially continuous phase in the structure. The structure may not include an inactive binder. The composition can include silicon. The plurality of engineered cavities can have an average pore dimension of at least 100 nm or at least 1 µm.

In certain embodiments, a battery is provided. The battery can include a first electrode comprising electrochemically active carbon and having a plurality of pores, a separator located within the plurality of pores, and a second electrode located within the plurality of pores, wherein the separator electrically isolates the first electrode from the second electrode. The battery may be a lithium ion battery and/or the second electrode may be a lithiated intercalation compound. The first electrode may be an electrode as described herein.

In certain embodiments, an electrode formed of a composition comprising carbon is provided. The electrode includes a first body of the composition, at least a portion of the first body having a first surface, a second surface and an interior between the first surface and the second surface, and a second body of the composition, at least a portion of the second body having a first surface, a second surface and an interior between the first surface and the second surface. The first and second bodies are coupled to form a portion of the electrode such that the first surfaces of the first and second bodies form a plurality of cavities between the first surfaces. An average pore size of the interior between the two surfaces can be at least an order of magnitude smaller than an average engineered cavity size outside of the interior.

In certain embodiments, a method of forming a battery electrode includes providing a plurality of members, applying an attachment substance to a first portion of at least some of the plurality of members, contacting a second portion of at least some of the plurality of members with the attachment substance, and pyrolysing the attachment substance to form a porous structure comprising electrochemically activated carbon. The method can also include stacking layers of the plurality of members with a space between each neighboring member, applying the attachment substance on at least one edge of the members, contacting a base with the attachment substance on at least one edge of the members, and pyrolysing the attachment substance.

The method, in one embodiment, includes stacking a first member, a second member, a third member and a fourth member of the plurality of members, at least one edge of the first member and at least one edge of the third member extend beyond at least one edge of the second member and at least one edge of the fourth member, at least one edge of the second member and at least one edge of the fourth member extend beyond at least one edge of the first member and at least one edge of the third member. The method can include applying the attachment substance on the at least one edge of the first member and the at least one edge of the third member that extend beyond the at least one edge of the second member and the at least one edge of the fourth member, and applying the attachment substance on the at least one edge of the second member and the at least one edge of the fourth member that extend beyond the at least one edge of the first member and the at least one edge of the third member. Furthermore, the method may include contacting a first base with the attachment substance on the at least one edge of the first member and the at least one edge of the third member that extend beyond the at least one edge of the second member and the at least one edge of the fourth member, and contacting a second base with the attachment substance on the at least one edge of the second member and the at least one edge of the fourth member that extend beyond the at least one edge of the first member and the at least one edge of the third member. In some embodiments, the method includes stacking an insert layer between the first member and the second member to create a spacing between the first member and the second member, and removing the insert layer after pyrolysing the attachment substance.

In another embodiment, the method further includes providing a first member of the plurality of members, applying more than one line of the attachment substance on at least one side of the first member, stacking a second member on the more than one line of the attachment substance on at least one side of the first member, applying more than one line of the attachment substance on the second member, stacking a third member on the more than one line of the attachment substance on the second member, wherein the first member, the second member and the third member comprise a precursor that can be converted to electrochemically active carbon, separating the first member, the second member and the third member in areas between the attachment substance, and pyrolysing the first member, the second member and the third member. Each of the lines of the attachment substance can be about midway between the lines of neighboring layers. A thickness of the lines can be about one-third a distance between adjacent lines or about the same as a distance from lines of neighboring layers.

The method may further include applying the attachment substance to at least one side of at least one of a plurality of members, at least one of the members comprises contours, and stacking the plurality of members. The contours may include folds, creases or pleats in the sheets.

In certain embodiments, the method includes providing a spacer, stacking the spacer between two members to physically separate the two members, and attaching the spacer to the two members with an attachment substance.

In other embodiments, the method includes providing a first member of the plurality of members, the first member is pleated and comprises a precursor, applying an attachment substance comprising a precursor to both sides of the first member, compressing the first member so that at least a portion of the first member contacts at least another portion of the first member, and pyrolysing the first member. The method may also include providing a second member of the plurality of members, the second member is pleated and comprises a precursor, compressing the second member so that at least a portion of the second member contacts at least another portion of the second member, and attaching the second member to the first member.

In certain embodiments, a method of forming a battery electrode includes molding or extruding a precursor into a structure that comprises a plurality of elongated pores, and pyrolysing the structure to form at least some electrochemically activated carbon.

Any of the methods may include applying a separator at least partially on at least one of the plurality of members. The attachment substance can include a precursor. The precursor can be, for example, a polyimide precursor. The attachment substance can include silicon. The plurality of members can include a precursor.

DETAILED DESCRIPTION

Figure 1:
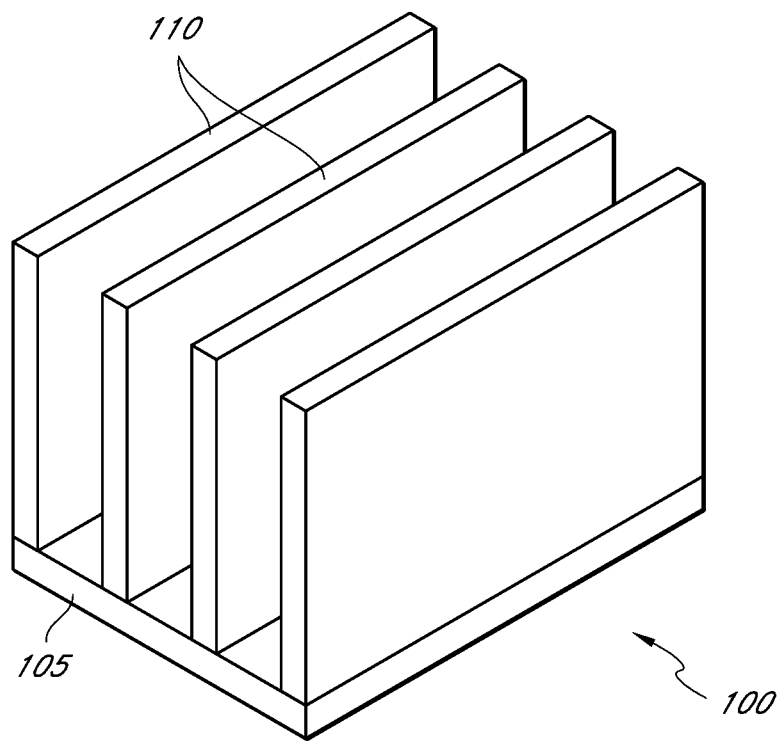
FIG. 1 illustrates an embodiment of a carbon electrode.

To be able to utilize electrode materials that may not be able to be rolled, other structures and methods are described herein. In particular, carbon can advantageously be used both as an electro-chemically active electrode material and as an electrically conductive material. The active materials in a battery are those that participate in the electrochemical charge/discharge reaction. Generally, carbon in a solid form (e.g., not carbon powder with a binder) has insufficient deformability to be able to be rolled as in a conventional wound battery; therefore, other carbon structures described herein can be used as carbon electrodes. Carbon structures and carbon electrodes include structures and electrodes that comprise carbon. Furthermore, carbon structures and carbon electrodes may or may not include one or more additional components such as silicon.

Typical carbon anode electrodes include a current collector such as a copper sheet which is an inactive material. Carbon is deposited onto the collector along with an inactive binder material. Carbon is often used because it has excellent electrochemical properties and is also electrically conductive. If the current collector layer (e.g., copper layer) was removed, the carbon along with the polymer binder material would be unable to mechanically support itself. Therefore, conventional electrodes require a support structure such as the collector to be able to function as an electrode.

The electrodes and electrode compositions described in this application can be or be used to produce electrodes that are self-supported. The need for a metal foil current collector is eliminated or minimized because conductive carbonized precursor or polymer is used for current collection in the electrode structure. The carbonized polymer can form a substantially continuous conductive carbon phase in the entire electrode as opposed to particulate carbon suspended in a non-conductive binder in a conventional lithium-ion battery electrode (e.g., the electrode does not include a binder such as an organic binder). Advantages of a carbon composite blend that utilizes a carbonized polymer include, but are not limited to, 1) higher capacity, 2) enhanced overcharge/discharge protection, 3) lower irreversible capacity due to the elimination (or minimization) of metal foil current collectors, and 4) potential cost savings due to simpler manufacturing.

This application also describes new methods of creating monolithic, self-supported electrodes using a carbonized polymer. Because the polymer is converted into a conductive matrix, the resulting electrode is conductive enough that a metal foil or mesh current collector can be omitted or minimized. In certain embodiments, the resulting electrode is an electrode that is comprised substantially of active material. In further embodiments, the resulting electrode consists essentially of or consists of active material. In some embodiments, the electrode consists essentially of or consists of active material and conductive material such as metal.

The electrode structures described herein can be used as an anode in most conventional lithium ion batteries; they can also be used as the cathode in some electrochemical couples with additional additives. The electrode structures can also be used in either secondary batteries (e.g., rechargeable) or primary batteries (e.g., non-rechargeable). In certain embodiments, the electrode structures are self-supported structures. In further embodiments, the electrode structures are self-supported monolithic structures. For example, the electrode may not include a collector (e.g., metal foil).

Described herein are also three-dimensional electrode structures and methods of making that have increased surface area per unit volume compared to a sheet. The three-dimensional electrode structures can have porous or cellular structure which can include, for example, pores, pits, grooves, cavities, and/or holes. In certain embodiments, the electrode structure is an open-cellular electrode structure. Advantageously, these electrode structures comprise electrochemically activated carbon that can act as both an active material and also as a current collector. These electrode structures can also be self-supporting electrode structures. In particular, the self-supporting electrode structure can include a self-supported composition that comprises electrochemically activated carbon. Self-supporting allows the structure or composition to retain a desired shape with out additional support members such as a metal foil current collector. In certain embodiments, the self-supported structure is a monolithic structure.

The self-supported composition and/or electrode can be substantially homogenous. For example, the electrochemically activated carbon can be substantially homogeneous throughout the self-supported composition and/or electrode. The composition and/or electrode can include a matrix of activated carbon and/or a continuous phase of activated carbon. In certain embodiments, the composition and/or electrode do not include an inactive binder (e.g., organic binder).

The electrodes described herein can be used in a battery such as a lithium-ion battery. In certain embodiments, a battery includes a first electrode comprising electrochemically active carbon and a porous or cellular structure. A separator film can be deposited (e.g., coated) within the porous or cellular structure, and a second electrode can then be positioned within the porous or cellular structure so that the separator electrically isolates the first electrode from the second electrode. Furthermore, an electrolyte may or may not be used in the battery; for example, a nonaqueous electrolyte may be used. Described below are further examples of electrodes and batteries along with methods of making the electrodes and batteries.

As described above, the carbon structures can be used as an anode and/or cathode in a battery. In certain embodiments, the carbon structure is chemically treated to be used as a cathode. For example, the carbon structure can go through a fluorination process or is treated with fluorine. In certain embodiments, the carbon structure does not necessarily need a chemical treatment to be used as an anode. In batteries described herein, the batteries have a carbon electrode and a second electrode. The second electrode can be any type of electrode that is compatible with the carbon electrode. For example, if the carbon electrode is the anode, the second electrode can be a suitable cathode electrode. Alternatively, if the carbon electrode is the cathode, the second electrode can be a suitable anode electrode. In certain embodiments, the second electrode is a second carbon electrode. In further embodiments, the second electrode comprises a lithiated intercalation compound.

The carbon structures can have a variety of compositions. For example, the carbon structure can be formed by first forming a structure of precursor (e.g., polymer precursor) and then pyrolising the precursor to form the carbon structure. Precursor compositions, electrode compositions, and separator compositions are further described in U.S. patent application Ser. No. 12/728,157, U.S. Provisional Patent Application No. 61/161,740, U.S. Provisional Patent Application No. 61/295,993, and U.S. Provisional Patent Application No. 61/315,845, the entirety of each of which is hereby incorporated by reference.

Figure 17:
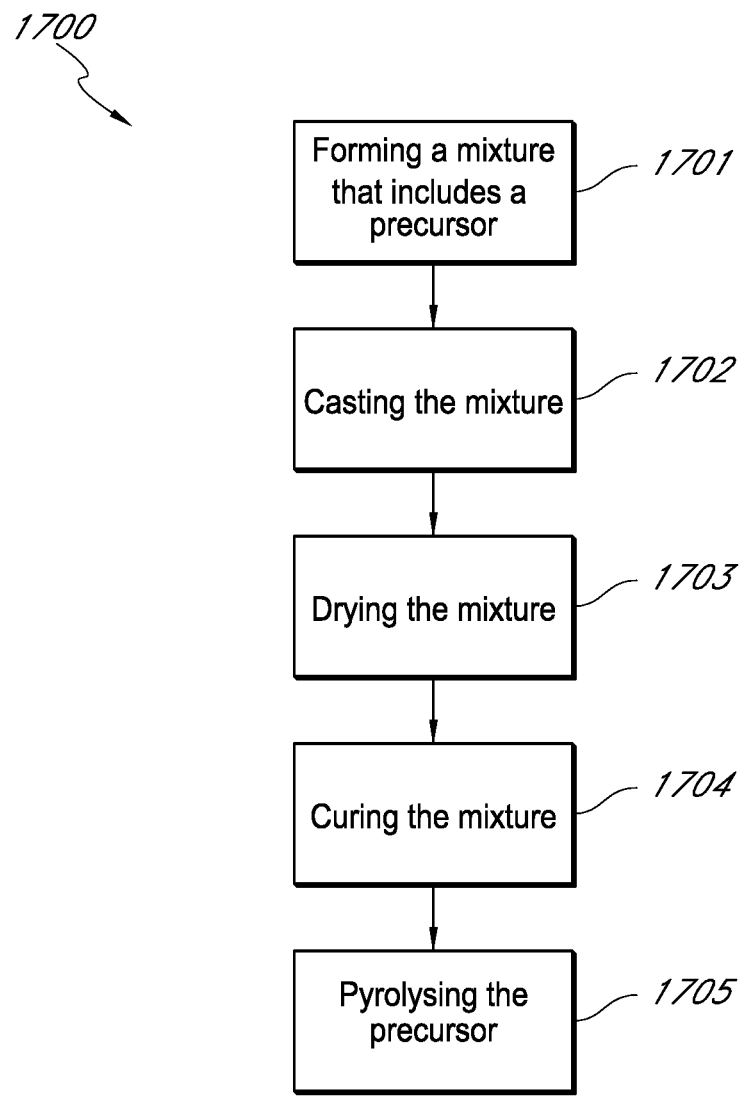
FIG. 17 illustrates an embodiment of a method of forming a material comprising carbon that includes forming a mixture that includes a precursor, casting the mixture, drying the mixture, curing the mixture, and pyrolysing the precursor.

FIG. 17 illustrates one embodiment of a method 1700 of forming a composition comprising carbon such as a carbon material. In certain embodiments, the method of forming a carbon material includes forming a mixture including a precursor, block 1701. The method can further include pyrolysing the precursor to convert the precursor to a carbon phase. The precursor mixture can include carbon additives such as graphite active material, chopped or milled carbon fiber, carbon nanofibers, carbon nanotubes, and/or other carbons. After the precursor is pyrolysed, the resulting carbon material can be a self-supporting monolithic structure. In certain embodiments, one or more materials are added to the mixture to form a carbon composite material. For example, silicon particles can be added to the mixture. The carbonized precursor results in an electrochemically active structure that holds the carbon composite material together. For example, the silicon particles can be distributed throughout the carbon composite material. Advantageously, the carbonized precursor will be a structural material as well as an electro-chemically active and electrically conductive material. In certain embodiments, material particles added to the mixture are homogenously distributed throughout the carbon composite material to form a homogeneous composite.

The mixture can include a variety of different components. The mixture can include one or more precursors. In certain embodiments, the precursor is a polyimide. For example, the precursor can be polyamic acid. Other precursors include phenolic resins, epoxy resins, and other polymers. The mixture can further include a solvent. For example, the solvent can be N-methyl-pyrollidone (NMP). Other possible solvents include acetone, diethyl ether, gamma butyrolactone, isopropanol, dimethyl carbonate, ethyl carbonate, dimethoxyethane, etc. Examples of precursor and solvent solutions include PI-2611 (HD Microsystems), PI-5878G (HD Microsystems) and VTEC PI-1388 (RBI, Inc.). PI-2611 is comprised of >60% n-methyl-2-pyrollidone and 10-30% s-biphenyldianhydride/p-phenylenediamine. PI-5878G is comprised of >60% n-methylpyrrolidone, 10-30% polyamic acid of pyromellitic dianhydride/oxydianiline, 10-30% aromatic hydrocarbon (petroleum distillate) including 5-10% 1,2,4-trimethylbenzene. Other examples of precursor polymers include phenolic resins that may be dissolved in solvents including n-methyl-2-pyrollidone or isopropyl alcohol. In certain embodiments, the amount of precursor in the solvent is about 10 to 30 wt. %. Additional materials can also be included in the mixture. For example, as previously discussed, silicon particles or carbon particles including graphite active material, chopped or milled carbon fiber, carbon nanofibers, carbon nanotubes, and other conductive carbons can be added to the mixture. In addition, the mixture can be mixed to homogenize the mixture.

In certain embodiments, the mixture is cast on a substrate, block 1702 in FIG. 17. In some embodiments, casting includes using a gap extrusion or a blade casting technique. The blade casting technique can include applying a coating to the substrate by using a flat surface (e.g., blade) which is controlled to be a certain distance above the substrate. A liquid or slurry can be applied to the substrate, and the blade can be passed over the liquid to spread the liquid over the substrate. The thickness of the coating can be controlled by the gap between the blade and the substrate since the liquid passes through the gap. As the liquid passes through the gap, excess liquid can also be scraped off. For example, the mixture can be cast on a polymer sheet, a polymer roll, or foils or rolls made of glass or metal.

The mixture can then be dried to remove the solvent, block 1703, to form a precursor member, sheet, film, etc. For example, a polyamic acid and NMP solution can be dried at about 110° C. for about 2 hours to remove the NMP solution. The dried mixture can then be removed from the substrate. For example, an aluminum substrate can be etched away with HCl. Alternatively, the dried mixture can be removed from the substrate by peeling or otherwise mechanically removing the dried mixture from the substrate. In certain embodiments, the dried mixture is a film or sheet.

In some embodiments, the dried mixture or precursor member is cured, block 1704. A hot press can be used to cure and to keep the dried mixture flat. For example, the dried mixture from a polyamic acid and NMP solution can be hot pressed at about 200° C. for about 8 to 16 hours. Alternatively, the entire process including casting and drying can be done as a roll-to-roll process using standard film-handling equipment. The dried mixture can be rinsed to remove any solvents or etchants that may remain. For example, deionized (DI) water can be used to rinse the dried mixture. In certain embodiments, the dried mixture is cut or mechanically sectioned into smaller pieces.

The mixture or precursor member can further go through pyrolysis to convert the precursor to carbon, block 1705. In certain embodiments, the mixture is pyrolysed in a reducing atmosphere. For example, an inert atmosphere, a vacuum and/or flowing argon, nitrogen, or helium gas can be used. In certain embodiments, the mixture is heated to about 900 to 1350° C. For example, polyimide formed from polyamic acid can be carbonized at about 1175° C. for about one hour. In certain embodiments, the heat up rate and/or cool down rate of the mixture is about 10° C./min. In certain embodiments, a holder can be used to keep the mixture in a particular geometry. The holder can be graphite, metal, etc. In certain embodiments, the mixture is held flat. After the mixture is pyrolysed, tabs can be attached to the pyrolysed material to form electrical contacts. For example, nickel, copper or alloys thereof can be used for the tabs.

In certain embodiments, one or more of the methods described herein is a continuous process. For example, casting, drying, curing and pyrolysis can be performed in a continuous process (e.g., the mixture can be coated onto a glass or metal cylinder). The mixture can be dried while rotating on the cylinder creating a film. The film can be transferred as a roll or peeled and fed into another machine for further processing. Extrusion and other film manufacturing techniques known in industry could also be utilized prior to the pyrolysis step.

Pyrolysis of the precursor results in a carbon material. In certain embodiments, the carbon material is a hard carbon. When the mixture includes one or more additional materials, a carbon composite material can be created. In particular, the mixture can include silicon particles creating a silicon-carbon or silicon-carbon-carbon composite material.

A battery with the carbon structures described herein can be any size. For example, the size can include the width, length and height of the battery. Embodiments of batteries include sizes on the order of $10^{-6}$ meters, $10^{-5}$ meters, $10^{-4}$ meters, $10^{-3}$ meters, $10^{-2}$ meters, $10^{-1}$ meters, $10^{0}$ meters, and $10^{1}$ meters. Other sizes are also possible.

In certain embodiments, an electrode includes a body (e.g., structure) of material formed in substantial part of carbon, the body having an exterior surface and an interior located within the exterior surface, and a plurality cavities located in the interior of the body. Each of the cavities can be in communication with the exterior of the body and having an interior surface. The cavities can each be sized to accommodate a battery separator located therein and substantially covering the interior surface of the cavity while still permitting sufficient room for a second electrode material to be located within the cavity spaced from the interior surface of the cavity by the separator.

The porous or cellular structure (e.g., porosity) can also have various dimensions. The porosity can be engineered porosity wherein the pores or cavities are selectively designed. For example, the pores can have a regular or ordered pattern or arrangement, and/or the pores can be regularly or evenly spaced from one another. The porous structure can include open porosity or be substantially open porosity (e.g., pores are open to an external surface of the porous structure). The pores (e.g., openings, pits, grooves, cavities, and/or holes) can have a sufficient size in order to include a separator and/or second electrode within the porosity (e.g., the pores have dimensions or are sized so that a separator can be inserted or deposited into the pores).

For example, the pore or cavity dimensions (e.g., width, length, depth, diameter) of the pores can be greater than about 100 nm and/or less than about 5 mm. The pores can include a largest dimension and a smallest dimension such as elongated pores. In certain embodiments, the average smallest dimension is between about 1 µm and about 100 µm. In a further embodiments, the average smallest dimension is between about 100 µm and about 1 mm or is between about 100 nm and 1 µm. The average largest dimension can be, for example, between about 100 µm and about 1 mm, or between about 1 mm and about 5 mm. In certain embodiments, the largest dimension is the pore length and the smallest dimension is a cross-sectional dimension. In further embodiments, the average smallest cross-sectional area of the pores is between about 1 µm$^2$ and about 0.01 mm$^2$ and/or between about 0.01 mm$^2$ and about 1 mm$^2$. The average volume of the pores can be, for example, 1 µm$^3$ to 0.001 mm$^3$ and/or between about 0.001 mm$^3$ and about 1 mm$^3$. An average engineered pore size (e.g., width, length, depth, diameter, cross-sectional area, volume) can be at least an order of magnitude larger than material porosity (e.g., porosity that may be formed when the structure is pyrolysed or converted into carbon) that is between neighboring engineered pores. For example, the material porosity may substantially be closed porosity (e.g., pores that are not open to an external surface of porous structure).

In certain embodiments, the porous structure includes a plurality of pores or cavities that have an average pore size and that have substantially the same pore size. For example, a substantially portion, substantially all, or all of the plurality of pores can have a pore size that is less than ten times the average pore size and that is greater than one-tenth the average pore size. In other examples, a substantially portion, substantially all, or all of the plurality of pores can have a pore size that is less than twice the average pore size and that is greater than one-half the average pore size or a pore size that is less than 110 percent of the average pore size and that is greater than 90 percent of the average pore size.

In further embodiments, the pores or cavities comprise a substantial portion of the volume of the porous structure or body. For example, the pores can comprise at least about 20 percent of the volume of the body, at least about 50 percent of the volume of the body, at least about 80 percent of the volume of the body, or at least about 90 percent of the volume of the body.

Figure 2:
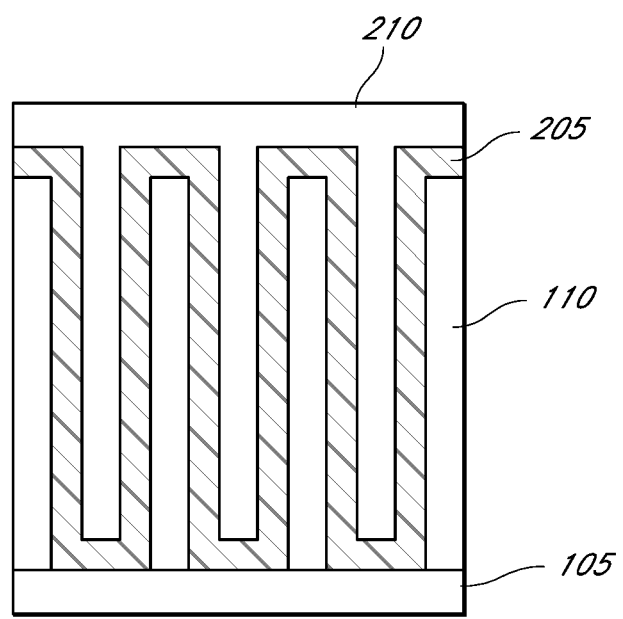
FIG. 2 illustrates an embodiment of the carbon electrode of FIG. 1 with a separator and a second electrode.

In certain embodiments, a carbon electrode 100 is formed with a base 105 and one or more sheets 110 attached to the base 105 as illustrated in FIG. 1. The sheets 110 can be substantially parallel to one another, and the base 105 can be substantially perpendicular to the sheets 110. FIG. 2 illustrates the carbon electrode 100 of FIG. 1 with a separator 205 and a second electrode 210. The separator 205 can be deposited or mechanically placed on the carbon electrode 100 surface. The second electrode 210 is located on or near the surface of the separator 205. For example, the second electrode 210 can be deposited onto the separator 205. Alternatively, the second electrode 210 can be mechanically located on the separator 205. In certain embodiments, the second electrode 210 can include a base and one more sheets similar to the carbon electrode 100. For example, the second electrode 210 can be a second carbon electrode. The second electrode sheets can be inserted in between the sheets 110 of the carbon electrode 100. An electrolyte can be used in addition to the separator 205 or instead of the separator 205. In addition, the carbon electrode and second electrode can be interchanged. In certain embodiments, the carbon electrode 100 is formed from a precursor. The precursor can be any polymer precursor that can be converted to electro-chemically active carbon. For example, polyimide can be used as the precursor. The polyimide precursor can be any commercially available polyimide precursor (e.g., Kapton HN from Dupont, Upilex S from UBE). In certain embodiments, the precursor includes additional additives such as silicon, silica, titanium oxide, etc. The additional additives can change electronic characteristics such as storage capacity, range of voltage span, etc. In certain embodiments, the sheets 110 are about 0.5 to 3 mils (about 12.7 to 76.2 µm) thick. In further embodiments, the sheets 110 are about 1 to 2 mils (about 25.4 to 50.8 µm) thick.

Figure 3A:
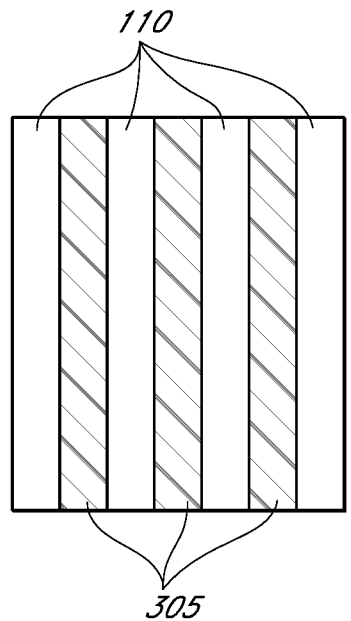
FIGS. 3A-D illustrate an embodiment of a method of making the carbon electrode of FIG. 1.
Figure 3B:
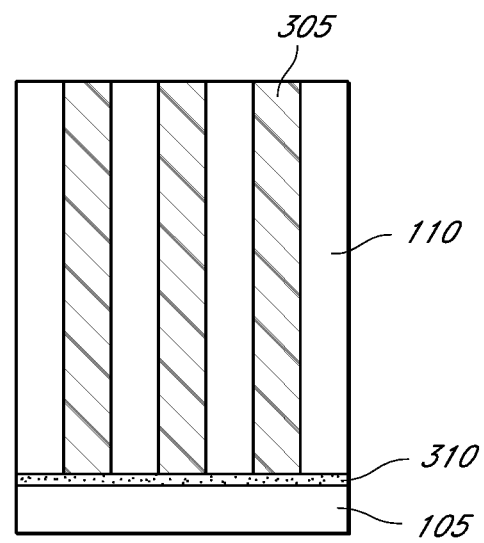

FIGS. 3A-D illustrate an embodiment of a method of forming a carbon electrode 100. The carbon electrode 100 is formed by stacking two or more sheets 110 with a removable layer 305 between the sheets 110, as illustrated in FIG. 3A. As illustrated in FIG. 3B, a base 105 is then attached to one side of the stacked sheets 110 and removable layers 305. In certain embodiments, the stacked sheets 110 and removable layers 305 are substantially perpendicular to the base 105. The base 105 can be attached to the stacked sheets 110 and removable layers 305 with an attachment substance 310. The attachment substance 310 can be placed on either the base 105 or the stacked sheets 110 and removable layers 305 prior to attaching them. The attachment substance 305 can be a precursor. The precursor can be any polymer precursor that can be converted to electro-chemically active carbon. For example, polyimide, epoxy, etc. can be used as the precursor. In certain embodiments, the attachment substance 310 is a liquid precursor such as a liquid polyimide precursor. The attachment substance 305 can be a similar precursor as the other components (e.g., sheets 110, base 105) of the carbon electrode 100. The liquid polyimide precursor can be any commercially available polyimide precursor (e.g. PI-5878G from HD Mircosystems, etc.).

Figure 3C:
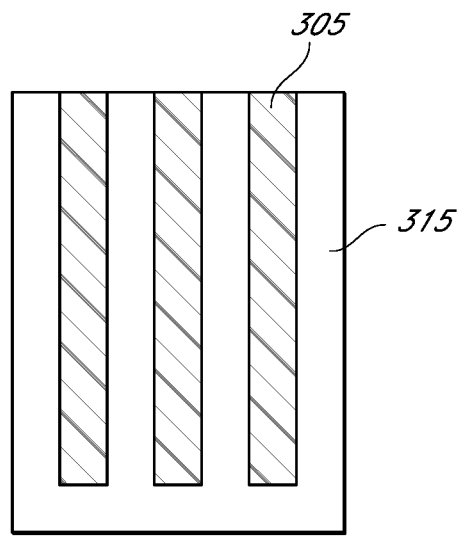

In certain embodiments, the stacked sheets 110, removable layers 305, base 105 and attachment substance 310 are exposed to elevated temperatures. Exposing the sheets 110, base 105 and attachment substance 310 to elevated temperatures can pyrolyse the precursors. For example, pyrolysis can be performed at a temperature near the decomposition temperature of the precursor. In certain embodiments, after pyrolysis, the sheets 110, base 105 and attachment substance 310 becomes a monolithic structure or material 315 as illustrated in FIG. 3C. In certain embodiments, the sheets 110 and base 105 were pyrolysed prior to assembly, and the attachment substance 310 is pyrolysed after assembly. In certain embodiments, the sheets 110, base 105 and attachment substance 310 are pyrolysed after assembly. In certain embodiments, the attachment substance 305 is a bonding substance. For example, the attachment substance 305 bonds (e.g. chemically bonds, etc.) with carbon and/or precursor components to form a monolithic carbon electrode. In certain embodiments, the attachment substance 305 has a substantially similar pyrolisis rate and dimensional change as the other components of the carbon electrode 100.

Figure 3D:
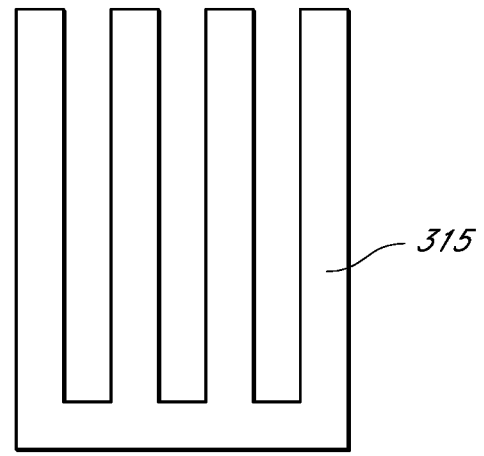

The removable layer 305 can be any material that is removable from the monolithic structure 315. For example, the removable layer 305 can be dissolved, reacted, melted, etc. In certain embodiments, the removable layer 305 is removed after pyrolysis of the sheets 110, base 105 and attachment substance 310. As illustrated in FIG. 3D, after the removable layer 305 is removed, a carbon monolithic structure 315 remains that resembles the carbon electrode 100 in FIG. 1.

Figure 4A:
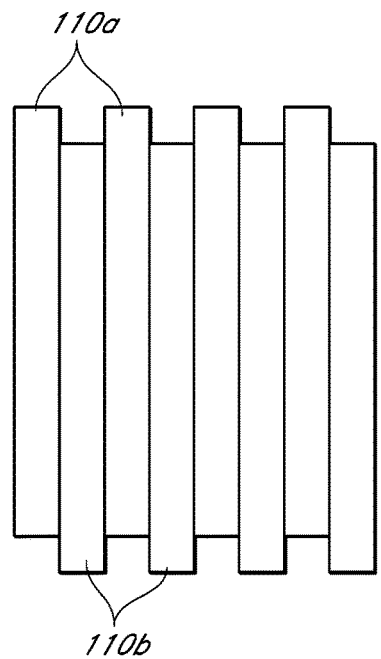
FIGS. 4A-D illustrate another embodiment of a method of making the carbon electrode of FIG. 1.
Figure 4B:
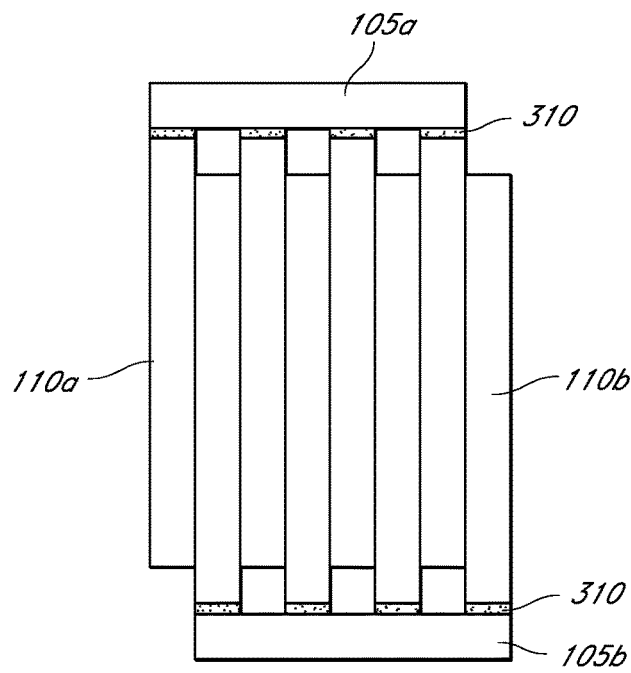
Figure 4C:
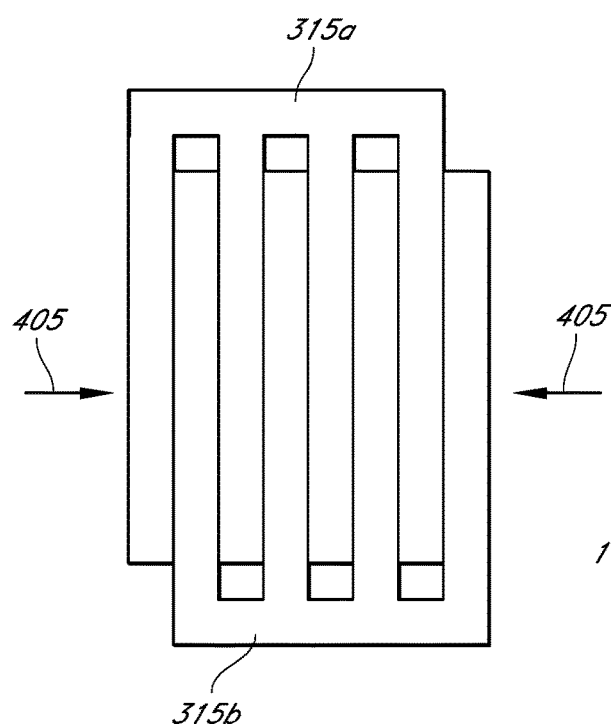
Figure 4D:
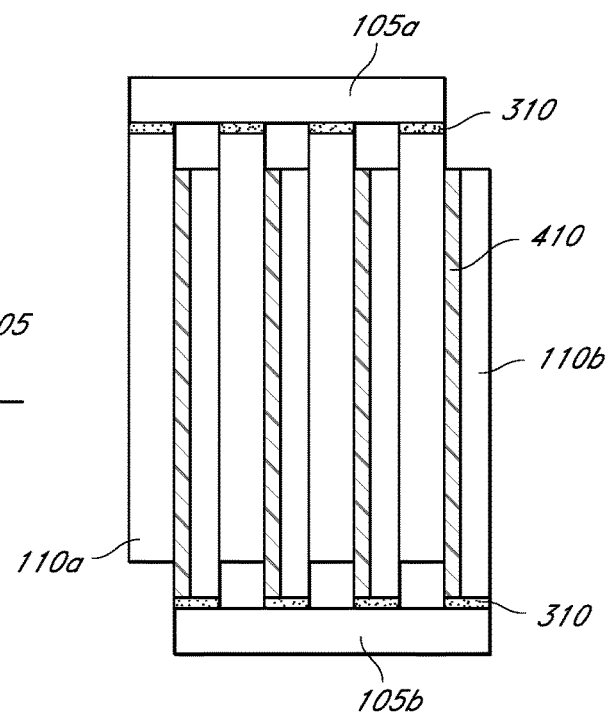

FIGS. 4A-D illustrate another embodiments of a methods of forming a carbon electrode 100. In certain embodiments, a monolithic structure 315 is formed without using removable layers 305 by stacking sheets 110. The sheets 110 are staggered relative to adjacent neighboring sheets 110, as illustrated in FIG. 4A. As illustrated in FIG. 4B, a base 105 is attached to each set of offset sheets 110. Each base 105 that is attached to each set of offset sheets 110 can be attached with an attachment substance 310 as described above. The entire assembly can then be heated to pyrolyse the precursors. In certain embodiments, pressure 405 can be applied perpendicular to the sheets 110 during pyrolysis, as illustrated in FIG. 4C. Pressure 405 can help to keep the sheets 110 straight and flat. After pyrolysis of the precursors, two monolithic structures 315a, 315b are formed, and the monolithic structures 315a, 315b can be subsequently separated. In certain embodiments, inserts 410 are placed between one or more sheets 110, as illustrated in FIG. 4D. The thickness of the inserts 410 can be adjusted to so that the desired thickness of the sheets 101 and the spacing between the sheets 101 can be achieved. In certain embodiments, the inserts 410 can be removed during or after pyrolysis. In certain embodiments, the inserts 410 can be any material and be removed in a similar way that of a removable layer 305 described above.

Figure 5:
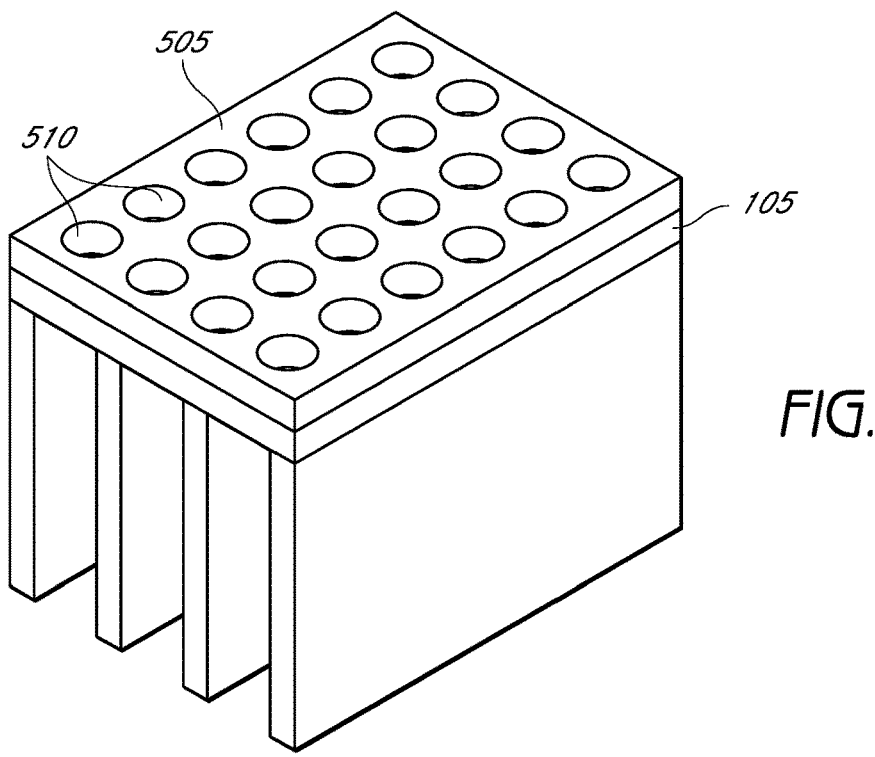
FIG. 5 illustrates an embodiment of an electrically conductive porous foil on the carbon electrode.
Figure 6A:
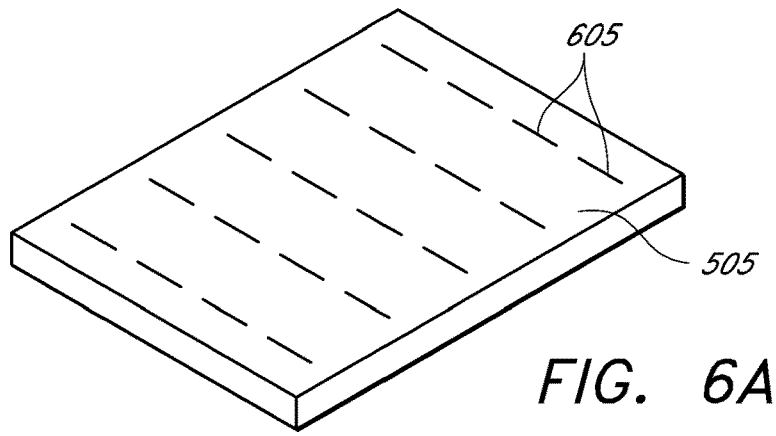
FIGS. 6A-B illustrate an embodiment of a method of making the electrically conductive porous foil of FIG. 5.
Figure 6B:
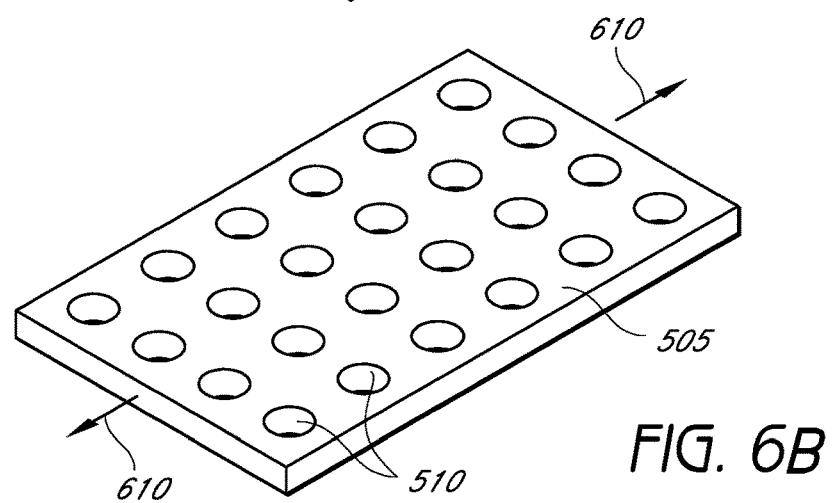

Typically, an electrically conductive tab is connected to each electrode. A metal sheet (e.g., metal foil) can be attached to the bottom of the base 105 to make a good electrical contact with the electrically conductive tab. The metal sheet thickness can be selected for appropriate power of the battery and to adequately conduct electrons to and from the electrode. The metal sheet typically has a coefficient of thermal expansion greater than carbon and precursors. If the metal sheet is deposited on the base 105 prior to pyrolysis, during pyrolysis, the expansion of the metal sheet can place a force on the precursors and cause failure (e.g., fracture) of the carbon. In addition, the expansion of the metal sheet and failure of the carbon can occur during any type of elevated temperature and not just during pyrolysis. One way to reduce the force the metal sheets place on the precursors is to have the metal sheet include a porous structure. For example, the metal sheet 505 can have a mesh structure with holes or voids 510 in the metal film (e.g., expanded metal foil), as illustrated in FIG. 5. The porosity in the metal sheet allows the metal sheet to expand locally, thereby reducing the force placed on the carbon and precursors during expansion. In one embodiment, a metal sheet 505 with a mesh structure is formed by first forming slits 605 in a metal sheet 505, as illustrated in FIG. 6A. A force 610 is then used to pull and deform the metal sheet 505, as illustrated in FIG. 6B. In certain embodiments, the slits are substantially parallel to one another, and the force that is used to pull the metal sheet is substantially perpendicular to the slits. The force deforms the metal sheet 505 and pulls the slits 605 open to form holes or voids 510 in the metal sheet 505. The metal sheet 505 can then be attached to the bottom of the base 105. For example, the metal sheet 505 can be attached with an attachment substance 310 (e.g. liquid precursor, etc.) as discussed above. After pyrolysis, the metal film will typically make a good electrical contact with the base 105. An electrically conductive material can be attached to the metal sheet 505 to form the electrically conductive tab.

Figure 7:
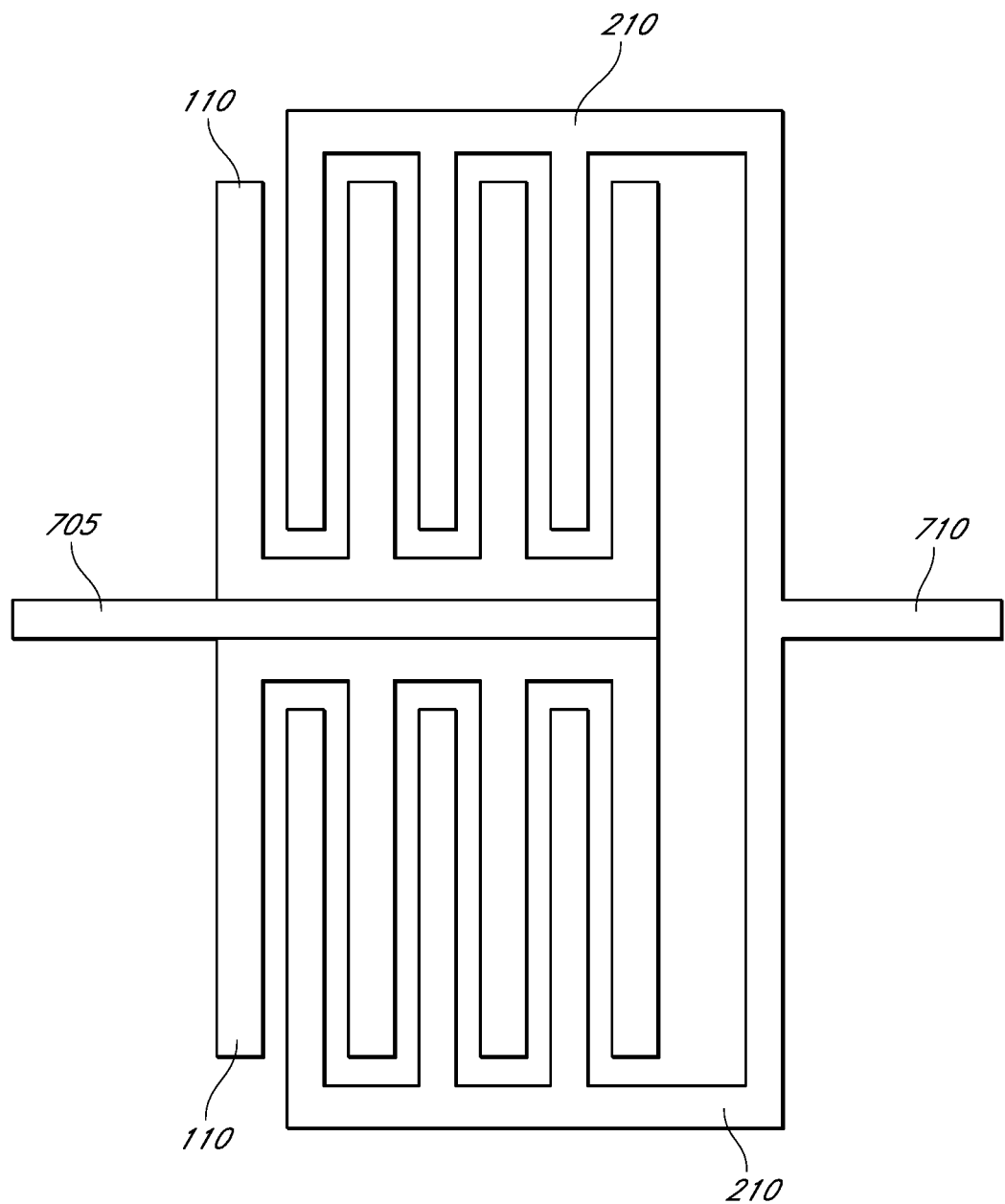
FIG. 7 illustrates an embodiment of two carbon electrode of FIG. 1 stacked to form a battery.

In certain embodiments, the carbon electrodes 100 can be stacked. For example, two carbon electrodes 100 can be stacked, as illustrated in FIG. 7. The bottom of the base 105 of each carbon electrode 100 is placed in electrical contact with the other one. An electrically conductive tab 705 can be placed between each carbon electrode 100. A second electrode 210 can then be placed around each of the carbon electrodes 100. The second electrodes can also be attached to an electrically conductive tab 710.

Carbon electrodes 100 can be made into many different types of structures. For example, a carbon electrode can be porous (e.g., pores, holes, voids). In certain embodiments, the pores have shapes like columns, quasi-columns, cylinders or quasi-cylinders. In certain embodiments, the pores are substantially uniform in shape and/or size. In certain embodiments, the pores are not uniform in shape and/or size. In certain embodiments, a carbon electrode includes a first surface and a second surface on an opposite side as the first surface. The carbon electrode can include a cellular structure. The cellular structure can include a plurality of elongated pores. The plurality of elongated pores can be substantially perpendicular to the first surface and the second surface, and the plurality of elongated pores can be open on the first surface and/or the second surface. In certain embodiments, the plurality of elongated pores are substantially closed other than being open on the first surface and/or the second surface. In certain embodiments, a substantial number of the plurality of elongated pores are open on the first surface and the second surface.

Figure 8A:
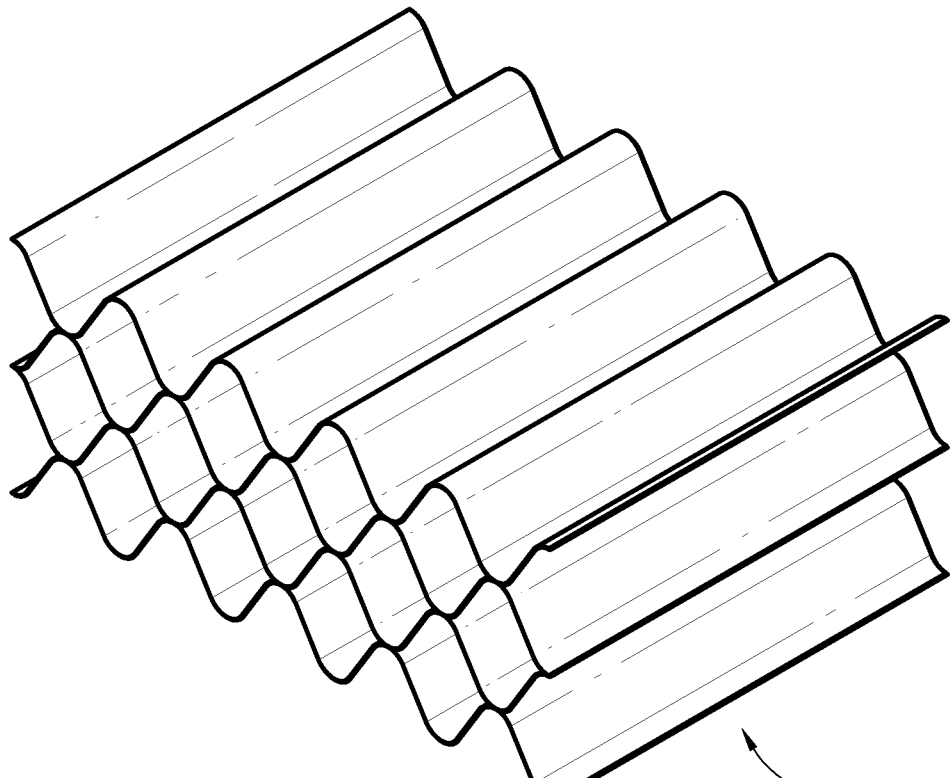
FIGS. 8A-C illustrate an embodiment of a carbon electrode accordion structure and a method of making the carbon electrode accordion structure.
Figure 8B:
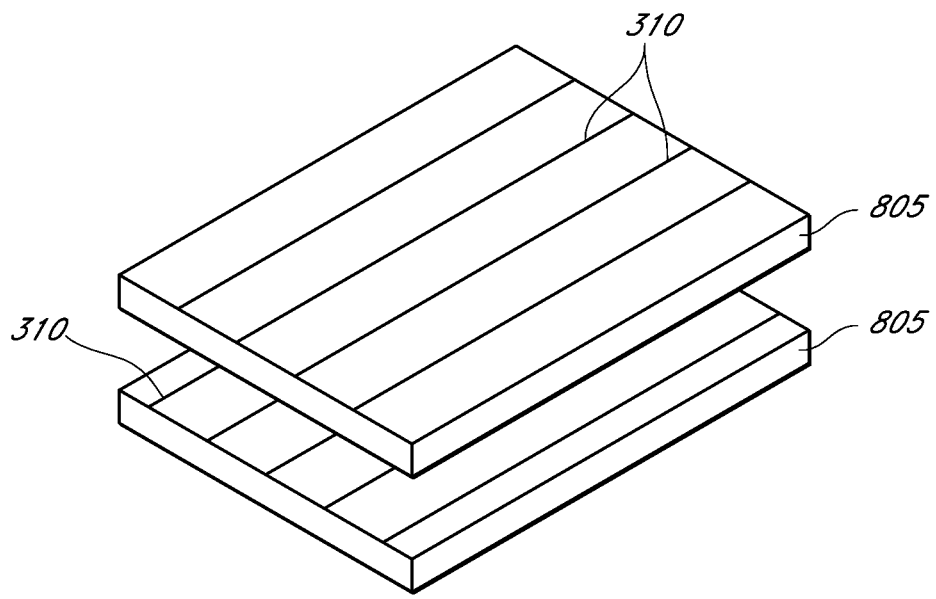
Figure 8C:
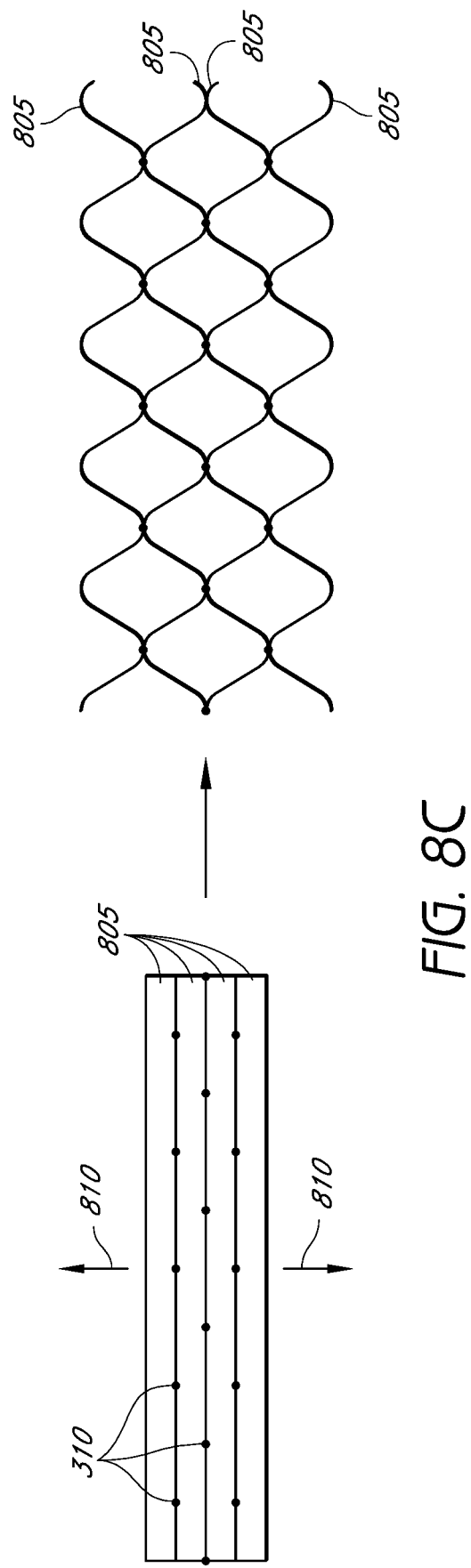

In certain embodiments, an accordion structure can be used as the carbon electrode 100, as illustrated in FIG. 8A. The accordion structured carbon electrode 100 can be formed by laying down substantially parallel lines of an attachment substance 310 (e.g., liquid precursor) on a sheet 805, as illustrated in FIG. 8B. In certain embodiments, the sheet 805 is a precursor sheet. As described above, the precursor can be any polymer precursor that can be converted to electro-chemically active carbon. In alternative embodiments, the sheet 805 is a carbon sheet. Another sheet 805 is placed on the attachment substance 310. Alternating sheets 805 and attachment substance 310 can stacked. In certain embodiments, two or more sheets 805 are stacked with one or more lines of the attachment substance 310 between. In certain embodiments, the lines of the attachment substance 310 are staggered for each alternating sheet 805. For example, the lines of the attachment substance 310 can be about midway between the lines of the attachment substance 310 on neighboring layers. In certain embodiments, the sheets 805 are precursor or carbon sheets that can be deformed to some extent before they fail. As illustrated in FIG. 8C, a force 810 can be used to pull the sheets 805 apart. The force 810 can include a force substantially perpendicular to the sheets 805. The locations or areas of the sheets that are not attached to one another by the attachment substance 310 are pulled apart resulting in a porous structure. For example, the porous structure illustrated in FIG. 8C is an accordion structure. The porous structure is pyrolysed to form a carbon electrode 100. In certain embodiments, the force 810 applied to the sheets 805 is applied during pyrolysis. For example, pins can be placed in the spaces between the sheets and between the attachment substance 310 to prevent the sheets 805 from elastically coming together before the sheets 805 and attachment substance 310 are pyrolised. In certain embodiments, pyrolysis converts the sheets 805 of precursor into carbon sheets, and the carbon sheets can retain the porous structure without the force 810 applied.

Figure 9A:
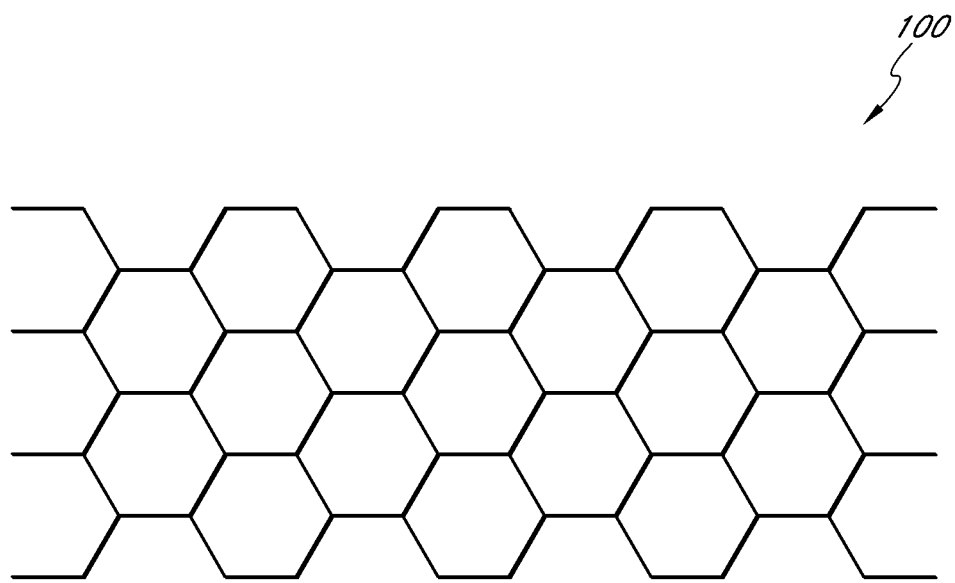
FIGS. 9A-B illustrate an embodiment of a carbon electrode honeycomb structure and a method of making the carbon electrode honeycomb structure.
Figure 9B:
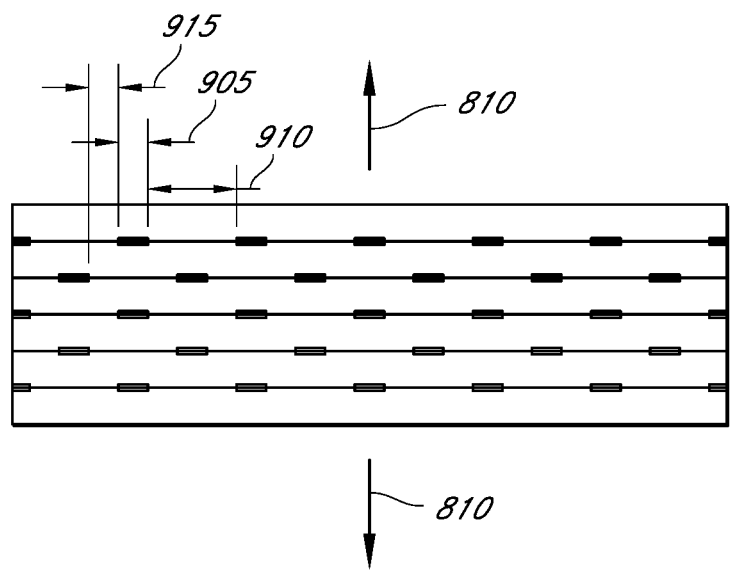

In certain embodiments, the carbon electrode 100 has a honeycomb structure, as illustrated in FIG. 9A. The honeycomb structure can be formed similar to the accordion structure. For the honeycomb structure, the lines of the attachment substance 310 are thicker. In certain embodiments, the line thickness 905 of the attachment substance 310 is about one-third the distance 910 between the adjacent attachment substance 310 lines. Furthermore, similar to the construction of the accordion structure, the lines of the attachment substance 310 can be about midway between the lines of neighboring layers. For example, the line thickness 905 and the distance 915 from lines of neighboring layers can be about the same. Similar to the construction of the accordion structure, a force 810 can be applied to the sheets 805 to form the porous honeycomb structure. Additional porous structures can formed by changing the line thickness 905, distance 910 between adjacent attachment substance 310 lines, and distance 915 between attachment substance 310 lines of neighboring layers. For example, the distance 910 between adjacent attachment substance 310 lines can be increased or decreased to increase or decrease the size of the pores, respectively.

Figure 10A:
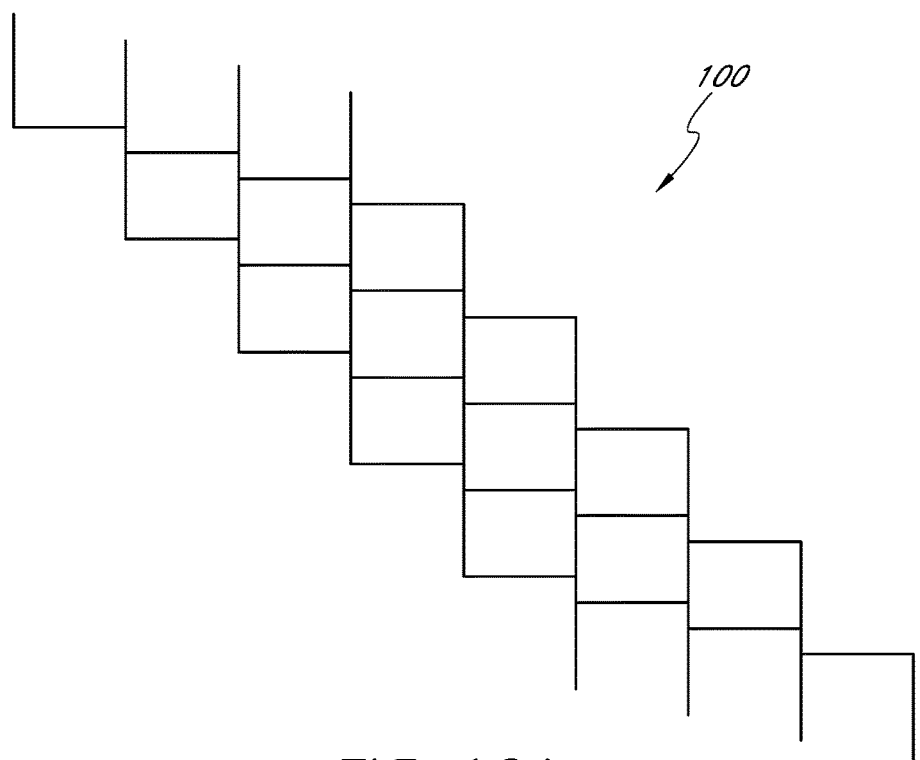
FIGS. 10A-B illustrate an embodiment of a carbon electrode square or rectangular structure and a method of making the carbon electrode square or rectangular structure.
Figure 10B:
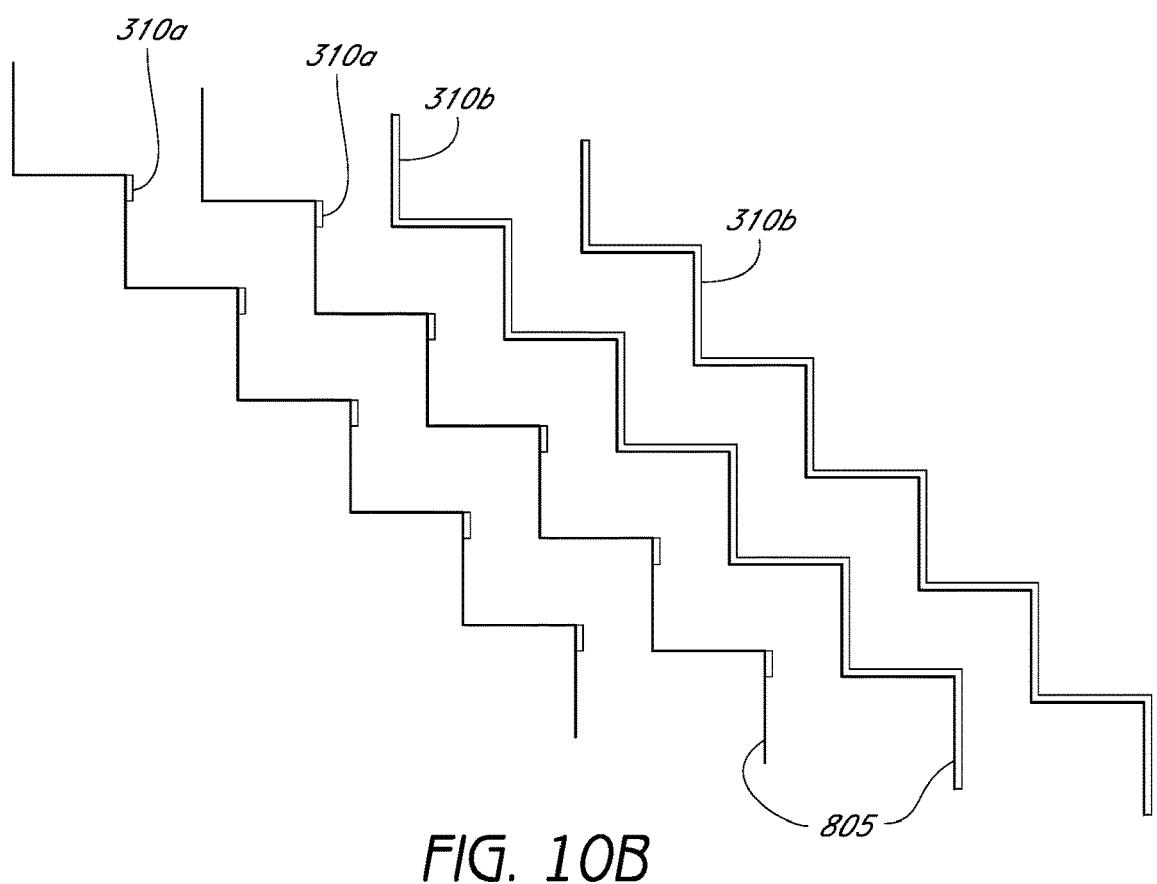

In certain embodiments, the carbon electrode 100 has a square or rectangular structure, as illustrated in FIG. 10A. In certain embodiments, each sheet 805 is formed into a step formation as illustrated in FIG. 10B. Lines of the attachment substance 310*a* can be placed at the edge of each step so that the adjacent sheet 805 can be attached to form a square or rectangular structure. Alternatively, the entire sheet 805 can be coated with the attachment substance 310*b* and an adjacent sheet 805 can be attached to make the square or rectangular structure. If the sheet 805 is coated with the attachment substance 310*b*, only locations or areas of a sheet 805 that are contacted to the attachment substance 310*b* are attached. If only the edge of each step is contacted with an adjacent sheet 805, the square or rectangular structure can be formed. In certain embodiments, after the sheets 805 are attached, the square or rectangular structure can be pyrolised to form a monolithic material.

Figure 11A:
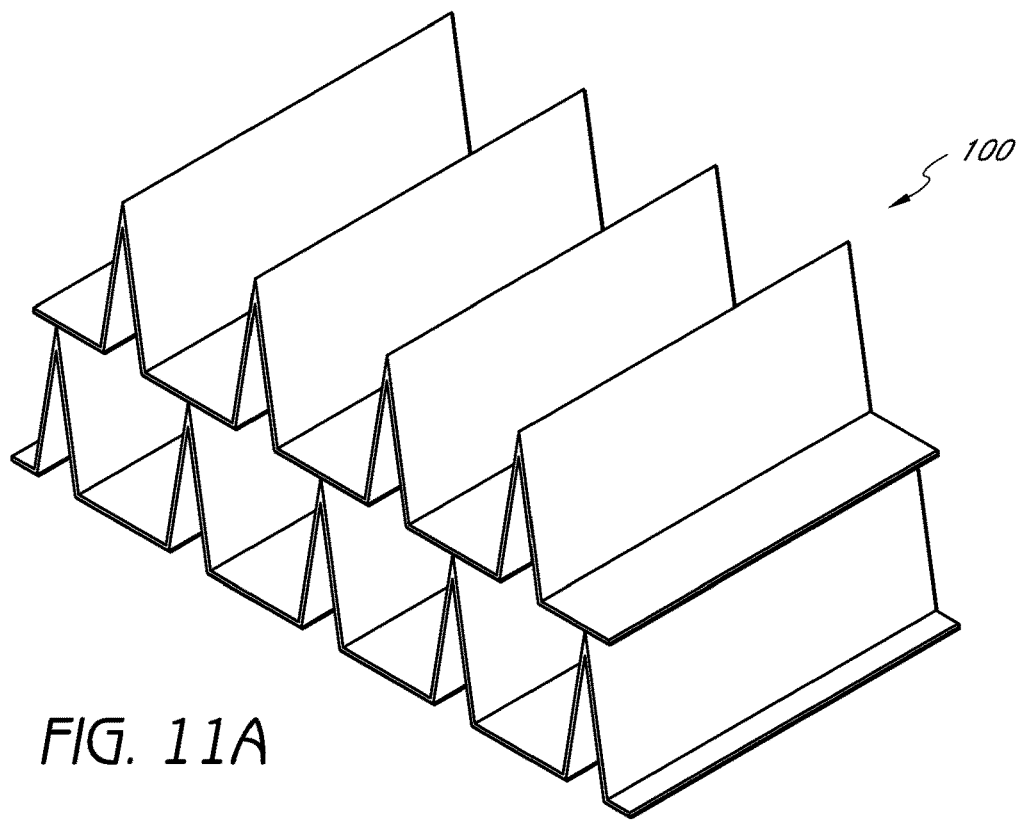
FIGS. 11A-B illustrate an embodiment of a carbon electrode folded-sheet structure and a method of making the carbon electrode folded-sheet structure.
Figure 11B:
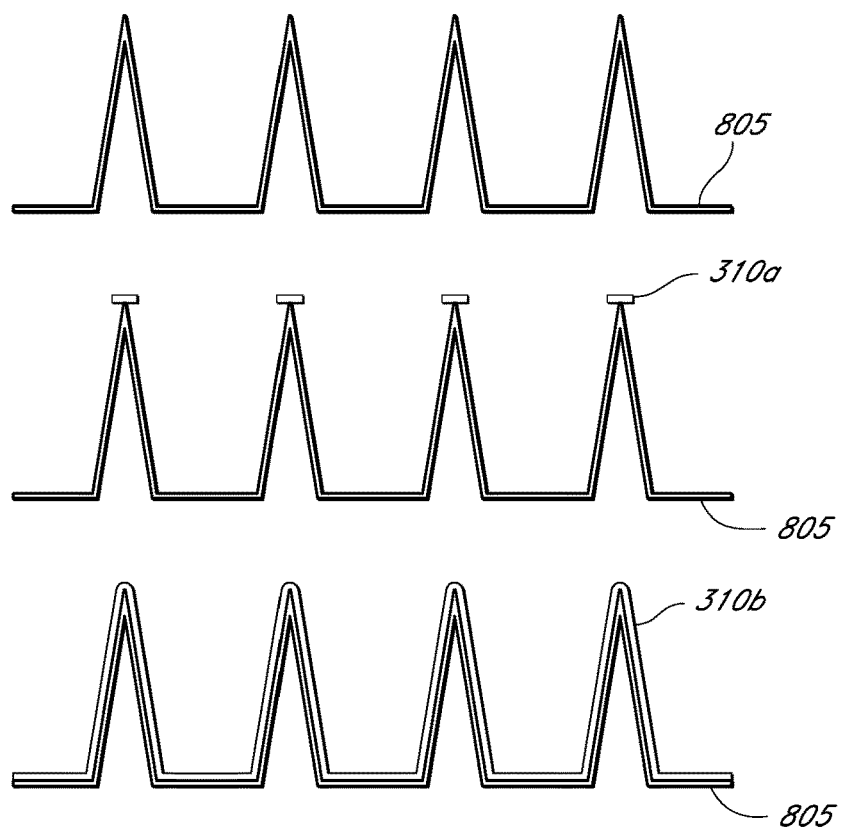

In certain embodiments, the carbon electrode 100 has a folded-sheet (e.g., folded-film) structure as illustrated in FIG. 11A. Each sheet 805 can be folded to form peaks, as illustrated in FIG. 11B. Similar to the square structure, attachment substance 310*a* can be placed at contact areas between the sheets 805 or the entire sheet can be coated with the attachment substance 310*b*. For example, the attachment substance 310*a* can be places at each peak or on either side of a sheet 805. If the peaks of one sheet 805 are contacted to another sheet 805, the sheets will be attached to one another by those points of contact. In certain embodiments, the peak of each fold contacts about in the middle of or midway between each fold of the neighboring sheet 805.

Figure 12:
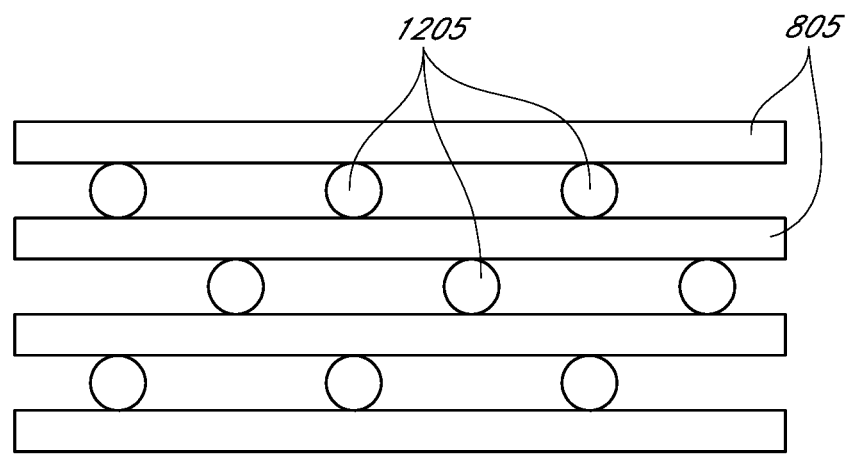
FIG. 12 illustrates an embodiment of a carbon electrode structure with spacers between sheets.

In certain embodiments, the carbon electrode 100 is formed of sheets 805 and spacers 1205, as illustrated in FIG. 12. Spacers 1205 can be placed between each sheet 805. In certain embodiments, the spacers 1205 are substantially parallel to each other. The spacers 1205 can be of different shapes and sizes. For example, the spacers 1205 can be wires or tubes. The spacers 1205 can be any material that the sheet 805 can be made of such as polyimide. The spacers 1205 can be attached to the sheets with an attachment substance 310. In certain embodiments, the spacers 1205 can be an attachment substance 310. For example, the attachment substance 310 can be applied sufficiently thick so as to create spaces or voids between the sheets 805. In certain embodiments, each spacer 1205 is placed about midway between spacers 1205 on neighboring sheets 805.

Figure 13A:
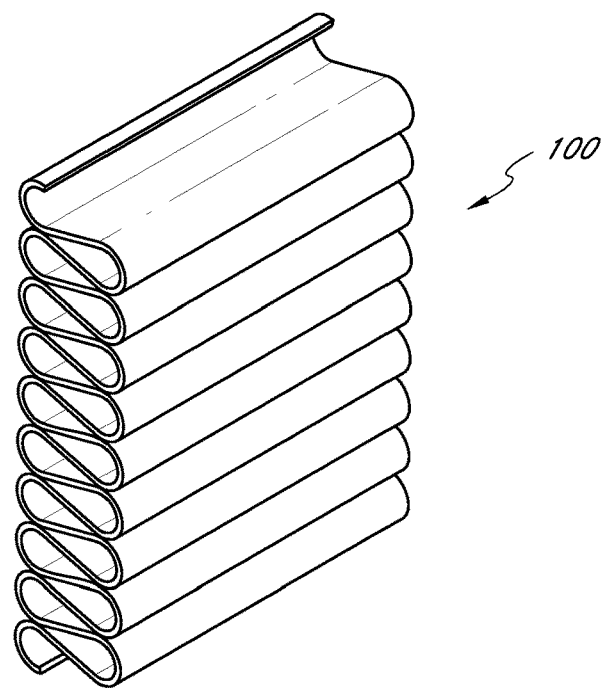
FIGS. 13A-C illustrate an embodiment of a carbon electrode ribbon candy structure and a method of making the carbon electrode ribbon candy structure.
Figure 13B:
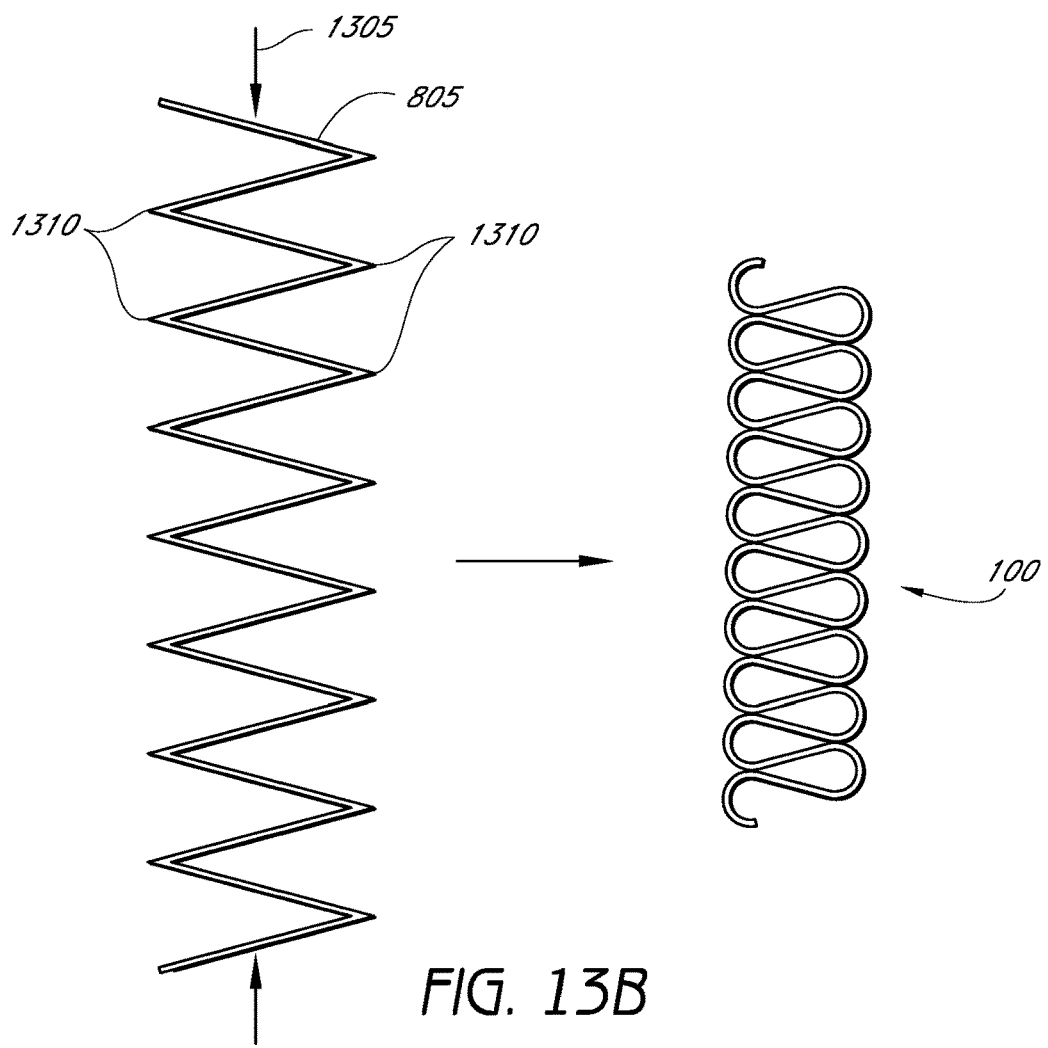
Figure 13C:
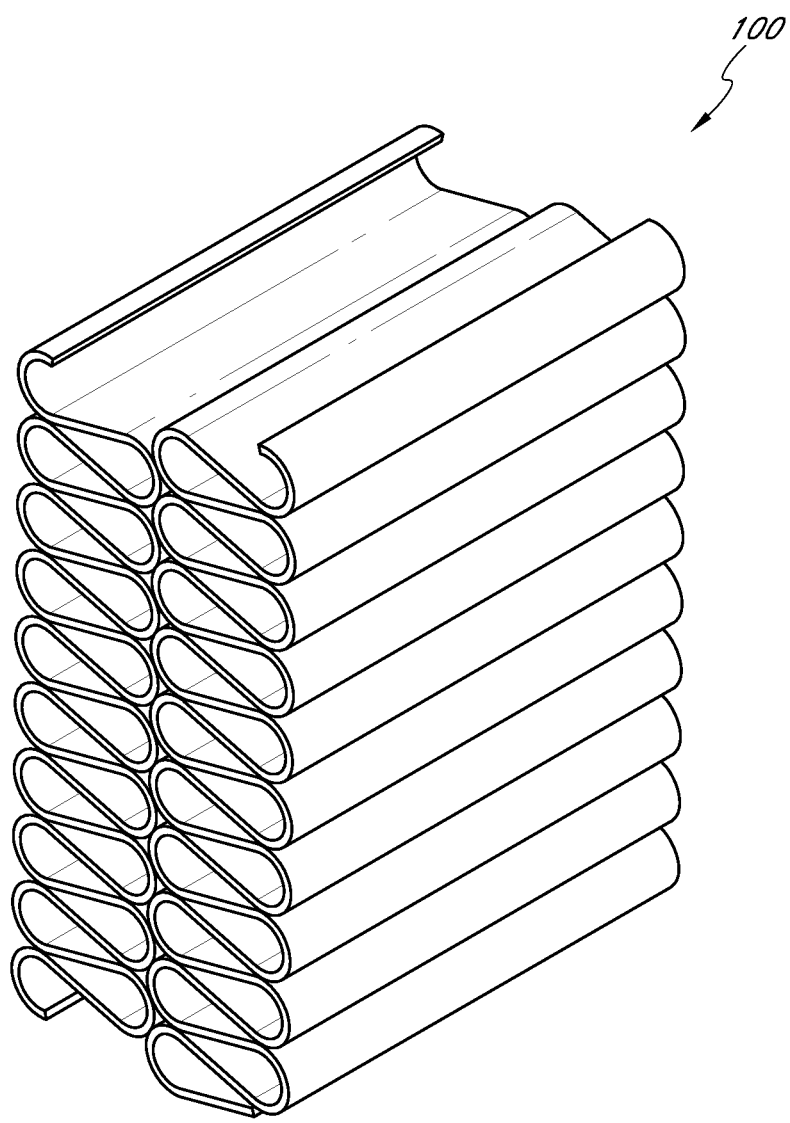

In certain embodiments, the carbon electrode 100 is formed into a ribbon candy structure, as illustrated in FIG. 13. The ribbon candy structure can be formed by compressing with a force 1305 on a pleated sheet 805. In certain embodiments, the force 1305 is applied substantially perpendicular to the pleats of the sheet 805 and substantially parallel to the length of the pleated sheet 805. When the pleated sheet 805 is compressed, the sharp angles of the pleats 1310 tend to round out and at least a portion of the pleated sheet 805 contacts at least another portion of the pleated sheet 805 to form a ribbon candy structure. The distance between pleats 1310 and the thickness of the sheet 805 can be adjusted to form a desired ribbon candy structure. In certain embodiments, a 1 mil sheet 805 can have a distance of about 3 to 7 mils between pleats 1310. The combination of the thickness of the sheet 805 and the distance between pleats 1310 can be optimized. For example, if they are not optimized, the contact areas of the sheet 805 on itself can become too large. In certain embodiments, an attachment substance 310 can be used to re-enforce the contact areas of the sheet 805 on itself. For example, the sheet 805 can be coated with the attachment substance 310. In certain embodiments, an attachment substance 310 is not used. The sheet 805 contact areas or locations advantageously decrease electron travel distance. In certain embodiments, two or more ribbon candy structures can be attached to form a larger carbon electrode 100. For example, as illustrated in FIG. 13C, two ribbon candy structures can be attached side-by-side. In certain embodiments, two or more ribbon candy structures can be stacked on top one another. An attachment substance 310 can also be used to attach the two or more ribbon candy structures together. For example, a liquid polyimide precursor can be used as an attachment substance 310. A conductive sheet (e.g., metal) can be electrically attached to any exposed surface of the carbon electrode 100. For example, a conductive sheet can be electrically attached to the top or the sides of a structure. A conductive film can be electrically attached to any of the structures illustrated in FIGS. 8-14.

Figure 14:
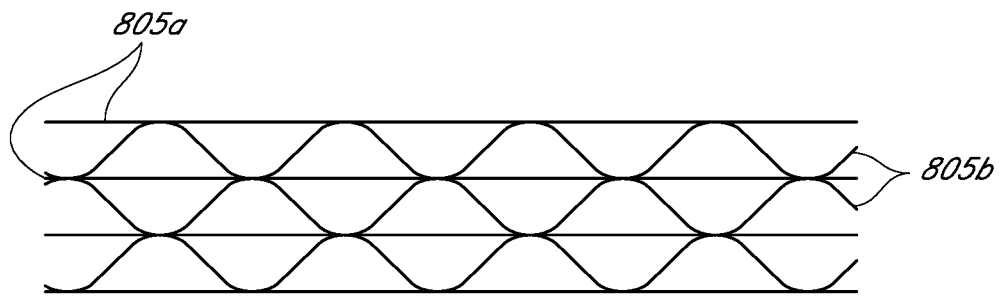
FIG. 14 illustrates an embodiment of a carbon electrode structure formed from alternating layers of contoured sheets and flat sheets.

In certain embodiments, the carbon electrode 100 is formed of alternating flat sheets 805*a* and contoured sheets (e.g., wavy sheets) 805*b*, as illustrated in FIG. 14. An attachment substance 310 can be used to attach alternating flat sheets 805*a* and wavy sheets 805*b* by coating the flat sheets 805*a* and/or the wavy sheets 805*b*. The wavy sheets 805*b* can be any shaped contoured sheet. For example, the wavy sheet 805*b* can be corrugated or folded. In certain embodiments, the sheets 805 described herein (e.g., FIGS. 8-14) can be any material that forms carbon during pyrolysis. For example, the sheets 805 can be a polyimide such as Upilex, Kapton, Apical, Northon TH, Kaptrex, etc. The pleating and/or folding of sheets 805, as described above, can be done with typical commercial pleating equipment. For example, typical pleating equipment can include pleating equipment used to make paper fans, window coverings, etc.

In certain embodiments, a carbon electrode can be molded into a three dimensional structure. In certain embodiments, the carbon electrode is molded into a structure described herein. The carbon electrode can be molded from and then converted to any electrically conductive electro-active carbon material. In certain embodiments, the carbon electrode is molded from polymer, epoxy, resin, etc. For example, the carbon electrode can be molded from a polymer such as Meldin, Vespel, Plavis, etc. In certain embodiments, a polymer is injected molded. In certain embodiments, two or more chemistries are mixed prior to or subsequently to entering the mold to form a polymer piece. In certain embodiments, the carbon electrode can also be formed from polyimide. The polymer piece can be subsequently pyrolised to form a carbon electrode 100. In certain embodiments, the carbon electrode is formed by extruding. The carbon electrode can be extruded into structures such as a tubular structure or honeycomb structure. A tubular structure can include an array of tubes. In certain embodiments, the tubes are at least partially compressed to form an elliptical tubular structure.

Figure 15:
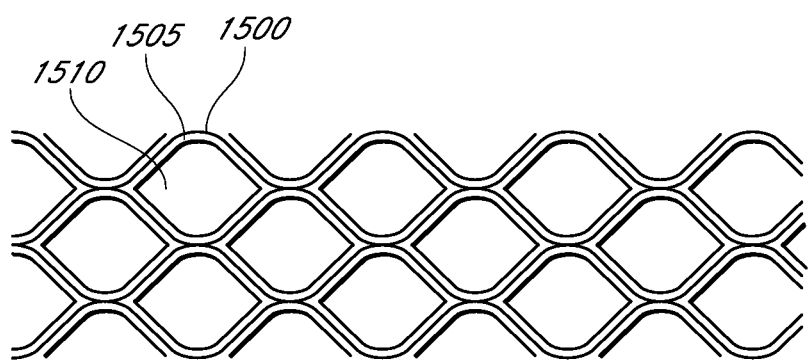
FIG. 15 illustrates an embodiment of a battery with a carbon electrode structure with porosity with a separator deposited within the porosity of the carbon electrode structure and a second electrode electrically separated from the electrode by the separator.

The carbon electrode structures described herein can be used to form an electrode of a battery. In certain embodiments, the carbon electrode structure 1500 can have a separator 1505 deposited on the carbon electrode structure 1500 and a second electrode 1510 deposited on the separator 1505. FIG. 15 illustrates an example of possible configuration of a carbon electrode 1500, separator 1505 and second electrode 1510. The separator 1505 can be a porous material or be deposited as described in U.S. patent application Ser. No. 12/728,157, the entirety of which is hereby incorporated by reference. The separator 1505 can also include an electrolyte.

In certain embodiments, the second electrode 1510 can be mechanically pushed or deposited into the spaces of the carbon electrode structure 1500. The second electrode 1510 can fill the entire space of the carbon electrode structure or can be a film (e.g., preformed film, deposited film). In certain embodiments, a second electrode slurry or powder is pushed into the spaces of the carbon electrode structure 1500. The second electrode slurry or powder can include a mixture of an electrode powder, electrically conductive powder (e.g., carbon black) and binder. In certain embodiments, the mixture includes a solvent such as NMP (e.g., N-Methylpyrrolidone). The second electrode slurry or powder can be pushed into the spaces of the carbon electrode structure 1500. If the second electrode is a slurry, it can be dried, cured and/or set. If the second electrode is a powder, it can be cured and/or set. In certain embodiments, the separator electrically separates the carbon electrode structure 1500 and the second electrode 1510. As discussed above, the second electrode can be any can be any type of electrode that is compatible with the carbon electrode.

Figure 16:
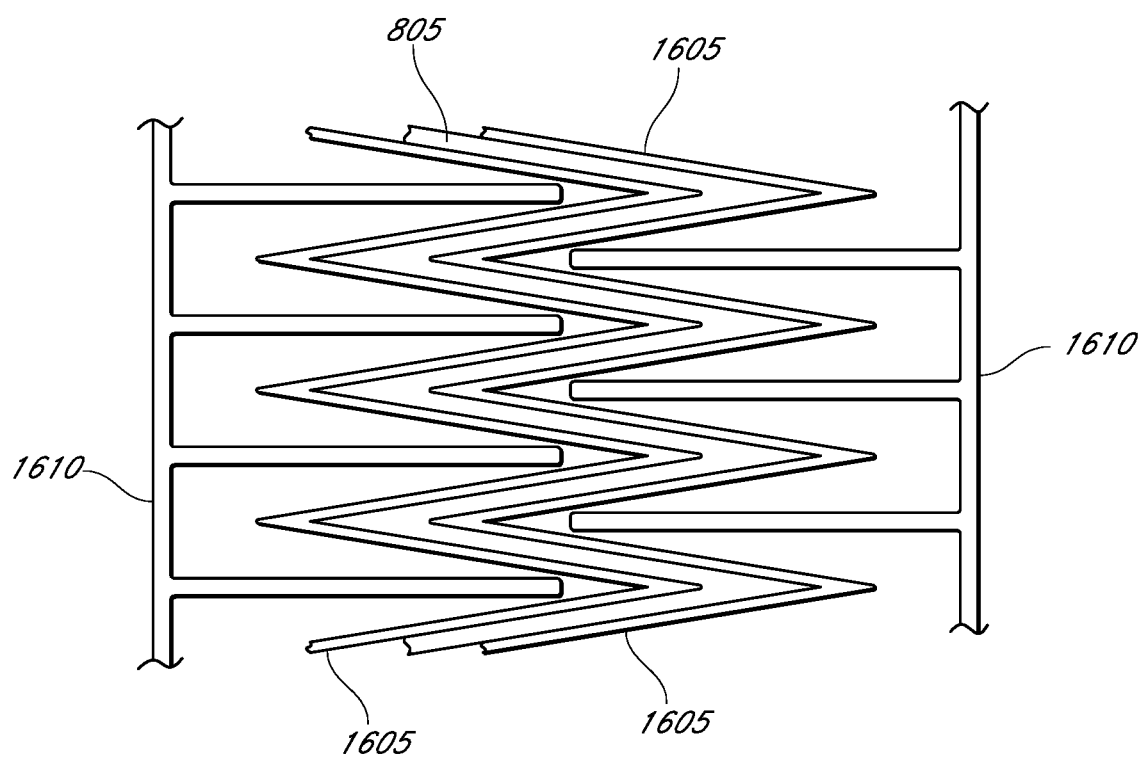
FIG. 16 illustrates an embodiment of a battery with a pleated carbon electrode structure with a separator deposited on the pleated carbon electrode structure along with a second electrode between the pleats of the carbon electrode structure.

In certain embodiments, the carbon electrode describe herein can be used with commercially available materials. For example, a commercially available separator 1605 and second electrode 1610 can be used with a corrugated carbon electrode sheet 805, as illustrated in FIG. 16. In certain embodiments, a commercially available separator and second electrode can be used with the carbon electrode 100 illustrated in FIG. 1. An electrolyte can also be used with the separator 1605. Commercially available separators can include porous polyethylene and polypropylene films, and commercially available second electrodes can include electro-chemically active material layers on metal films (e.g., copper, aluminum).

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A method of forming an electrode for a battery, the method comprising:
   providing a stack of sheets, wherein
      each sheet comprises a first precursor,
      the first precursor comprises silicon,
      the stack of sheets includes an attachment substance between neighboring sheets of the stack of sheets; and
      the attachment substance comprises a second precursor;
   pulling apart neighboring sheets of the stack of sheets in areas not attached by the attachment substance such that a plurality of pores is formed between the neighboring sheets; and
   pyrolysing the stack of sheets to convert the first precursor and the second precursor into carbon.

2. The method of claim 1, wherein the first precursor further comprises one or more of: a polyimide, a phenolic resin, or an epoxy resin.

3. The method of claim 1, comprising placing, prior to the pyrolysing of the stack of sheets, pins between the neighboring sheets to retain the plurality of pores formed between the neighboring sheets.

4. The method of claim 1, wherein providing the stack of sheets comprises:
   applying first lines of the attachment substance to a first surface of a first sheet of the stack of sheets; and
   stacking a second sheet of the stack of sheets on the first sheet such that the first lines of the attachment substance directly attach the first sheet of the electrode to the second sheet of the electrode.

5. The method of claim 4, wherein the first lines of the attachment substance are substantially parallel.

6. The method of claim 5, wherein providing the stack of sheets comprises:
   applying second lines of the attachment substance on a second surface of the second sheet such that the second lines are laterally offset from the first lines and substantially parallel to the first lines; and
   stacking a third sheet of the stack of sheets on the second sheet such that the second lines of the attachment substance directly attach the third sheet of the electrode to the second sheet of the electrode.

7. The method of claim 4, wherein the first lines have a thickness that is about one-third of a distance between adjacent first lines of the attachment substance.

8. The method of claim 1, wherein the plurality of pores are substantially regularly spaced.

9. The method of claim 1, wherein the electrode comprises a volume and the plurality of pores comprise at least 50 percent of the volume.

10. The method of claim 1, wherein the pyrolysing the stack of sheets comprises pyrolysing the stack of sheets after pulling apart the neighboring sheets to form the plurality of pores.

11. The method of claim 1, comprising the pyrolysing the stack of sheets comprises pyrolysing the stack of sheets while pulling apart the neighboring sheets to form the plurality of pores.

12. The method of claim 1, further comprises applying the attachment substance as a liquid to one or more sheets of the stack of sheets.

13. A method of forming a battery cell, the method comprising:
   forming a first electrode of the battery cell, wherein the forming comprises:
      providing a stack of sheets, wherein
         each sheet comprises a first precursor mixture,
         the first precursor mixture comprises a first precursor and silicon,
         the stack of sheets includes an attachment substance between neighboring sheets of the stack of sheets, and
         the attachment substance comprises a second precursor;
      pulling pull apart neighboring sheets of the stack of sheets in areas not attached by the attachment substance such that a plurality of pores is formed between the neighboring sheets; and pyrolysing the stack of sheets to convert the first precursor and the second precursor into carbon; and after forming the first electrode,
coating a pore of the plurality of pores with a separator; and
inserting a second electrode of the battery cell into the pore such that the separator isolates the first electrode from the second electrode.

14. The method of claim 13, wherein the first precursor comprises one or more of: a polyimide, a phenolic resin, or an epoxy resin.

15. The method of claim 13, comprising placing, prior to the pyrolysing of the stack of sheets, pins between the neighboring sheets to retain the plurality of pores formed between the neighboring sheets.

16. The method of claim 13, wherein providing the stack of sheets comprises:
applying first lines of the attachment substance to a first surface of a first sheet of the stack of sheets; and
stacking a second sheet of the stack of sheets on the first sheet.

17. The method of claim 16, wherein the first lines of the attachment substance are substantially parallel.

18. The method of claim 16, wherein the first lines have a thickness that is about one-third of a distance between adjacent first lines of the attachment substance.

19. The method of claim 18, wherein providing the stack of sheets comprises:
applying second lines of the attachment substance on a second surface of the second sheet such that the second lines are laterally offset from the first lines and substantially parallel to the first lines; and
stacking a third sheet of the stack of sheets on the second sheet.

20. The method of claim 13, wherein the plurality of pores are substantially regularly spaced.

21. The method of claim 13, wherein the first electrode comprises a volume and the plurality of pores comprise at least 50 percent of the volume.

22. The method of claim 13, wherein the pyrolysing the stack of sheets comprises pyrolysing the stack of sheets after pulling apart the neighboring sheets to form the plurality of pores.

23. The method of claim 13, comprising the pyrolysing the stack of sheets comprises pyrolysing the stack of sheets while pulling apart the neighboring sheets to form the plurality of pores.

24. The method of claim 13, further comprises applying the attachment substance as a liquid to one or more sheets of the stack of sheets.

* * * * *